US012642320B2

(12) United States Patent
Kherkheulidze et al.

(10) Patent No.: US 12,642,320 B2
(45) Date of Patent: *Jun. 2, 2026

(54) FLAMEPROOF MATERIAL FOR WEARABLES, PERSONAL PROTECTIVE EQUIPMENT, LITHIUM-ION BATTERY FLAME PROTECTION, AND GENERAL FLAME PROTECTION

(71) Applicant: Elven Technologies, Inc., Rancho Cordova, CA (US)

(72) Inventors: Vamekh Kherkheulidze, Tbilisi (GE); Giorgi Gabarashvili, Ksovrisi (GE); Alexandr Chubinidze, Tbilisi (GE); Bela Butskhrikidze, Aspindza (GE); Farid Ismayilzada, Rancho Cordova, CA (US)

(73) Assignee: ELVEN TECHNOLOGIES, INC., Sacramento, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/372,107

(22) Filed: Sep. 24, 2023

(65) Prior Publication Data

US 2024/0099406 A1 Mar. 28, 2024

Related U.S. Application Data

(60) Provisional application No. 63/410,118, filed on Sep. 26, 2022.

(51) Int. Cl.
| | | |
|---|---|---|
| *A41D 31/08* | (2019.01) |
| *A41D 27/12* | (2006.01) |
| *B32B 3/06* | (2006.01) |
| *B32B 5/24* | (2006.01) |
| *B32B 5/26* | (2006.01) |
| *B32B 7/09* | (2019.01) |
| *B32B 7/12* | (2006.01) |

(52) U.S. Cl.
CPC ........... *A41D 31/085* (2019.02); *A41D 27/12* (2013.01); *B32B 3/06* (2013.01); *B32B 5/245* (2013.01); *B32B 5/26* (2013.01); *B32B 7/09* (2019.01); *B32B 7/12* (2013.01); *A41D 2500/50* (2013.01); *B32B 2250/05* (2013.01); *B32B 2262/0246* (2013.01); *B32B 2262/0269* (2013.01); *B32B 2262/101* (2013.01); *B32B 2262/14* (2013.01); *B32B 2266/057* (2016.11); *B32B 2266/126* (2016.11); *B32B 2437/00* (2013.01)

(58) Field of Classification Search
None
See application file for complete search history.

(56) References Cited

U.S. PATENT DOCUMENTS

| | | | |
|---|---|---|---|
| 2,573,414 | A | 10/1951 | Dunn |
| 2,966,684 | A | 1/1961 | Bonin |
| 3,043,300 | A | 7/1962 | Flagg |
| 3,242,979 | A | 3/1966 | Shlosinger |
| 3,295,594 | A | 1/1967 | Hopper |
| 3,348,236 | A | 10/1967 | Copeland |
| 3,452,812 | A | 7/1969 | Betts |
| 3,507,321 | A | 4/1970 | Palma |
| 3,670,518 | A | 6/1972 | Esposito |
| 3,743,012 | A | 7/1973 | Laxo |
| 3,763,497 | A | 10/1973 | Leach |
| 3,869,871 | A | 3/1975 | Rybalko |
| 4,118,946 | A | 10/1978 | Tubin |
| 4,172,454 | A | 10/1979 | Warncke |
| 4,310,926 | A | 1/1982 | Maroist |
| 4,513,452 | A | 4/1985 | Rankin, Sr. |
| 4,691,762 | A | 9/1987 | Elkins |
| 4,914,752 | A | 4/1990 | Hinson |
| 4,998,415 | A | 3/1991 | Larsen |
| 5,014,355 | A | 5/1991 | Vollenweider, II |
| 5,088,115 | A | 2/1992 | Napolitano |
| 5,098,770 | A | 3/1992 | Paire |
| 5,320,164 | A | 6/1994 | Szczesuil |
| 5,393,595 | A | 2/1995 | Rousset |

(Continued)

FOREIGN PATENT DOCUMENTS

| | | |
|---|---|---|
| CN | 104553091 | 4/2015 |
| CN | 110558646 | 12/2019 |

(Continued)

OTHER PUBLICATIONS https://research-repository.rmit.edu.au/articles/thesis/Incorporation_of_aerogel_and_phase_change_material_in_textiles_for_thermal_protection/27590235?file=50760465 (Year: 2018) (Year: 2018).*
PCT International Search Report and Written Opinion, International Appl. No. PCT/US23/33567, Applicant: Elven Technologies, Inc., International Filing Date: Sep. 24, 2023, Mailing Date Feb. 22, 2024, 15 pages.
PCT International Search Report and Written Opinion, International Appl. No. PCT/US23/033578, Applicant: Elven Technologies, Inc., International Filing Date: Sep. 25, 2023, Mailing Date Mar. 11, 2024, 12 pages.

(Continued)

*Primary Examiner* — Arti Singh-Pandey
(74) *Attorney, Agent, or Firm* — SNELL & WILMER L.L.P.

(57) ABSTRACT

Flameproof material for wearables, personal protective equipment, lithium-ion battery flame protection, and general flame protection are disclosed. A particular embodiment includes a flameproof material comprising: a first material being a combination of Oxidized Polyacrylonitrile (PAN) fiber and Para-aromatic polyamide (P-aramid) fiber; a second material being a combination of Oxidized PAN fiber, fire-resistant rayon (FR-rayon), and P-aramid fiber; and a third material being a combination of silica aerogel and fibrous glass configured for bonding with the first or second materials, the second material being configured for bonding with the first or third materials.

10 Claims, 26 Drawing Sheets

(56)                References Cited

U.S. PATENT DOCUMENTS

| | | |
|---|---|---|
| 5,421,326 A | 6/1995 | Rankin |
| 5,438,707 A | 8/1995 | Horn |
| 5,538,583 A | 7/1996 | Szczesuil |
| 5,774,902 A | 7/1998 | Gehse |
| 6,109,338 A | 8/2000 | Butzer |
| 6,209,144 B1 | 4/2001 | Carter |
| 6,228,784 B1 | 5/2001 | Mochizuki |
| 6,297,178 B1 | 10/2001 | Berbner |
| 6,551,347 B1 | 4/2003 | Elkins |
| 6,743,498 B2 | 6/2004 | Fourmeux |
| 6,957,697 B2 | 10/2005 | Chambers |
| 7,284,398 B2 | 10/2007 | Hübner |
| 7,348,059 B2 | 3/2008 | Zhu |
| 7,565,705 B2 | 7/2009 | Elkins |
| 7,744,999 B2 | 6/2010 | Zhu |
| 7,807,589 B2 | 10/2010 | Huang |
| 8,375,475 B2 | 2/2013 | Rose |
| 8,586,489 B2 | 11/2013 | Shteiyer |
| 8,793,814 B1 | 8/2014 | Diianni |
| 9,415,246 B2 | 8/2016 | Kuroda |
| 9,580,843 B2 | 2/2017 | Okuya |
| 9,732,446 B2 | 8/2017 | Favier |
| 9,918,502 B2 | 3/2018 | Oliver |
| 10,076,153 B2 | 9/2018 | Gamer |
| 10,137,662 B2 | 11/2018 | Nutt |
| 10,213,634 B1 | 2/2019 | Maldonado |
| 10,357,935 B2 | 7/2019 | Lee |
| 10,450,679 B2 | 10/2019 | Matsumoto |
| 10,626,306 B2 | 4/2020 | Goletto |
| 10,711,394 B2 | 7/2020 | Yi |
| 10,980,292 B2 | 4/2021 | Fan |
| 11,078,608 B2 | 8/2021 | Tanaka |
| 11,118,287 B2 | 9/2021 | Shimada |
| 2002/0142132 A1 | 10/2002 | Fourmeux |
| 2003/0019476 A1 | 1/2003 | Chambers |
| 2004/0157521 A1 | 8/2004 | Montini |
| 2006/0042326 A1 | 3/2006 | Hubner |
| 2006/0116043 A1 | 6/2006 | Hope et al. |
| 2006/0144557 A1 | 7/2006 | Koscheyev |
| 2006/0191063 A1 | 8/2006 | Elkins |
| 2006/0264136 A1 | 11/2006 | Chiantese |
| 2010/0071119 A1 | 3/2010 | Thatcher |
| 2010/0086763 A1 | 4/2010 | Huang |
| 2011/0171469 A1 | 7/2011 | Shah |
| 2012/0042442 A1 | 2/2012 | Takahashi |
| 2012/0110721 A1 | 5/2012 | Takahashi |
| 2012/0289763 A1 | 11/2012 | Boyden |
| 2013/0212790 A1 | 8/2013 | Waxman et al. |
| 2015/0044924 A1 | 2/2015 | Yi |
| 2015/0075185 A1 | 3/2015 | Sims |
| 2016/0039170 A1 | 2/2016 | Nutt |
| 2016/0040326 A1 | 2/2016 | Okuya |
| 2018/0044561 A1 | 2/2018 | Goletto |
| 2019/0105867 A1 | 4/2019 | Nutt |
| 2020/0259144 A1 | 8/2020 | Kang |
| 2020/0260531 A1 | 8/2020 | Gaab et al. |
| 2020/0276789 A1 | 9/2020 | Oliveros |
| 2020/0281284 A1 | 9/2020 | Mcallister |
| 2021/0180920 A1 | 6/2021 | Bhandari et al. |
| 2021/0227906 A1 | 7/2021 | Brahms et al. |
| 2021/0352974 A1 | 11/2021 | Kirchmeier |
| 2022/0251749 A1 | 8/2022 | Borchardt et al. |

FOREIGN PATENT DOCUMENTS

| | | | | |
|---|---|---|---|---|
| EP | 1861524 B1 * | 4/2012 | ........... | D04H 1/5416 |
| WO | WO2016013353 A1 | 1/2016 | | |

OTHER PUBLICATIONS

International Bureau, International Preliminary Report on Patentability dated Mar. 1, 2025 in International Application No. PCT/US2023/033567.

Japan Patent Office, Japanese Office Action dated Jan. 7, 2026 in Application No. 2025-517986.

International Searching Authority, International Search Report and Written Opinion dated Feb. 22, 2024 in PCT Serial No. PCT/US2023/033567.

International Searching Authority, International Preliminary Report on Patentability dated Mar. 1, 2025 in PCT Serial No. PCT/US2023/033578.

Shaid. "Incorporation of aerogel and phase change material in textiles for thermal protection" Doctoral thesis (online). RMIT University. Aug. 2018; Retrieved from the Internet on Dec. 19, 2023: <URL: https://core.ac. uk/download/pdf/185278046.pdf>; p. 17, paragraph 2; p. 20, paragraph 3.

USPTO Office Action dated Oct. 21, 2025 in U.S. Appl. No. 19/253,794.

USPTO, Office Action dated Aug. 20, 2025 in U.S. Appl. No. 18/372,211.

USPTO, Restriction Requirement dated Aug. 25, 2025 in U.S. Appl. No. 19/253,794.

* cited by examiner

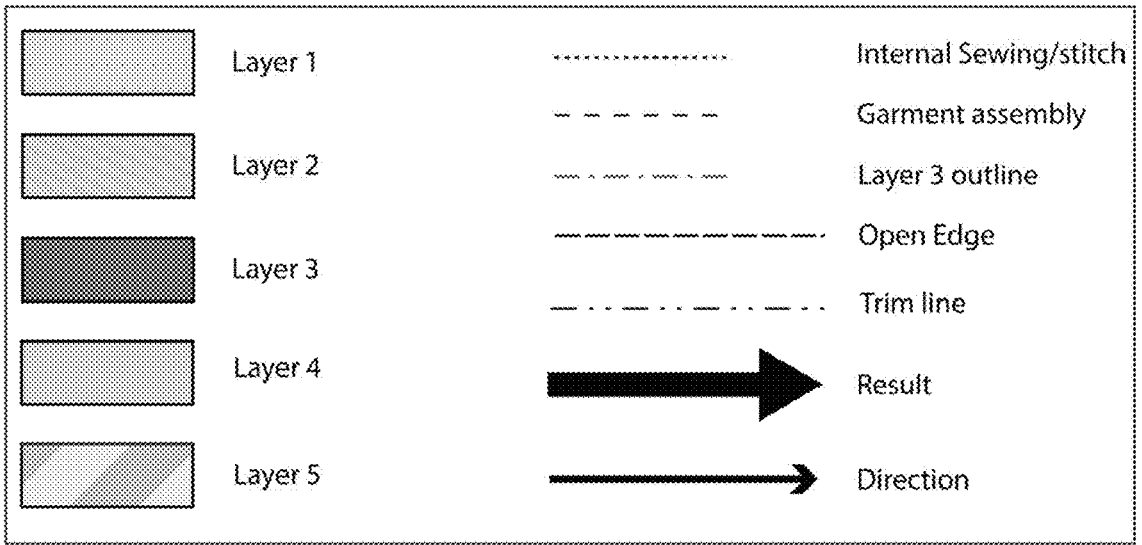
Figure 1 - Legend
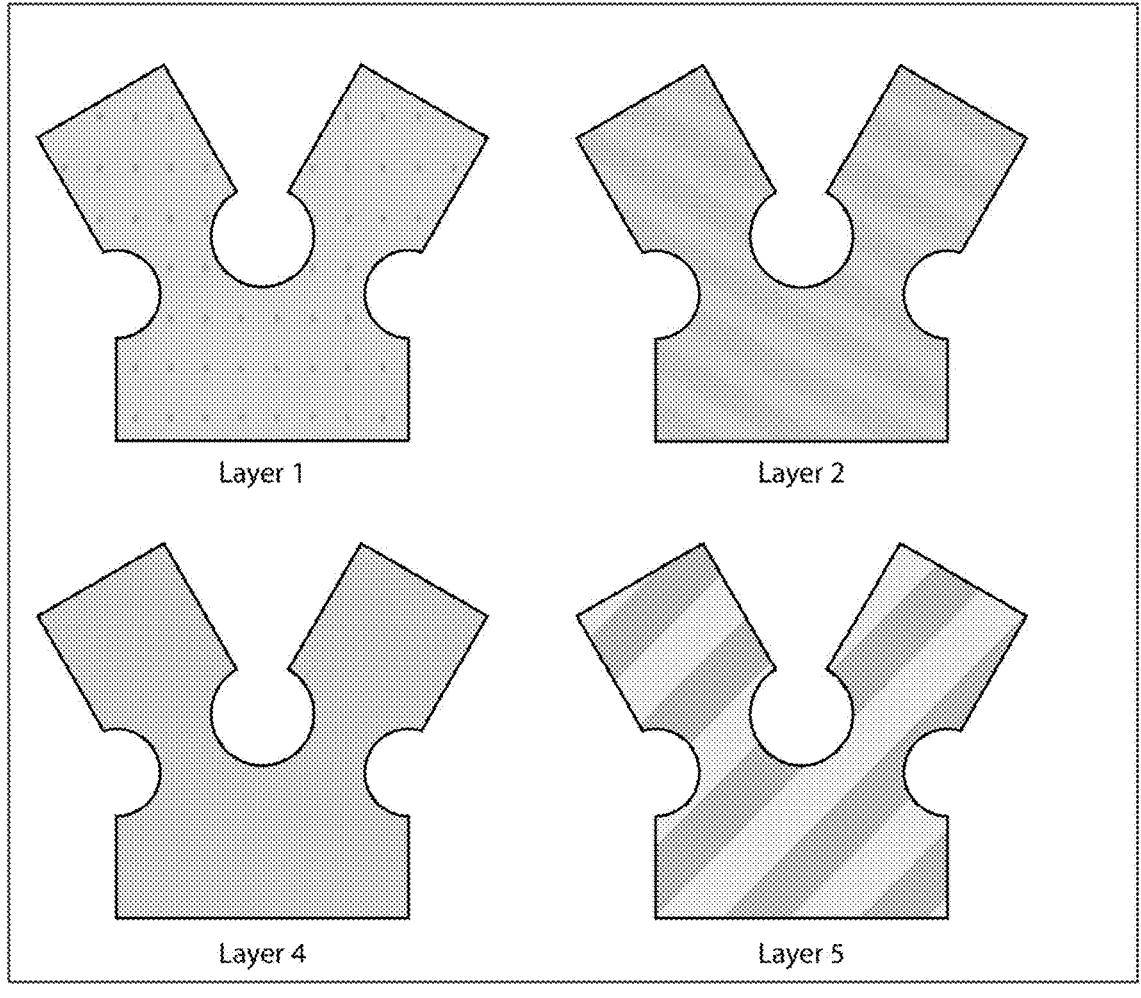
Figure 2

2D view 3D view 2D view 3D view 2D view 3D view 2D view 3D view 2D view 3D view 2D view 3D view 2D view 3D view Fireproof material wrap for high-voltage poles.

High explosive armament bay and fuel tanks of armored vehicle outfitted with flameproof material for protection from external fire.

Flameproof material used as lithium-battery enclosure in electric vehicle

Flameproof material used as lithium-battery enclosure in energy storage

Flameproof material used as atmospheric reentry heat shield for a spacecraft

Flameproof material used as internal layer for fireproofing a door

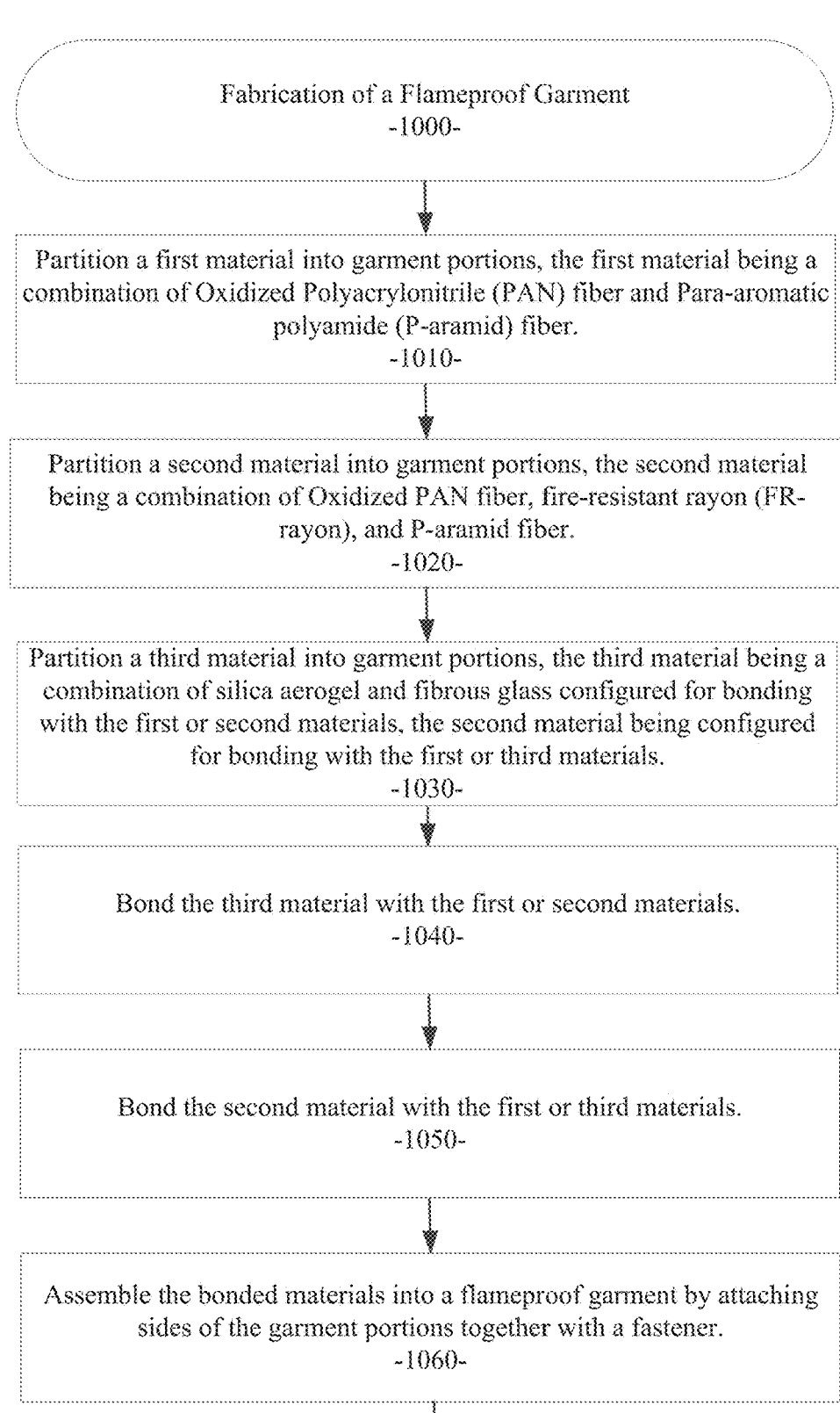

Fabrication of a Flameproof Garment
-1000-

Partition a first material into garment portions, the first material being a combination of Oxidized Polyacrylonitrile (PAN) fiber and Para-aromatic polyamide (P-aramid) fiber.
-1010-

Partition a second material into garment portions, the second material being a combination of Oxidized PAN fiber, fire-resistant rayon (FR-rayon), and P-aramid fiber.
-1020-

Partition a third material into garment portions, the third material being a combination of silica aerogel and fibrous glass configured for bonding with the first or second materials, the second material being configured for bonding with the first or third materials.
-1030-

Bond the third material with the first or second materials.
-1040-

Bond the second material with the first or third materials.
-1050-

Assemble the bonded materials into a flameproof garment by attaching sides of the garment portions together with a fastener.
-1060-

End

FLAMEPROOF MATERIAL FOR WEARABLES, PERSONAL PROTECTIVE EQUIPMENT, LITHIUM-ION BATTERY FLAME PROTECTION, AND GENERAL FLAME PROTECTION

PRIORITY PATENT APPLICATION

This non-provisional patent application draws priority from U.S. provisional patent application Ser. No. 63/410,118; filed Sep. 26, 2022. The entire disclosure of the referenced patent application is considered part of the disclosure of the present application and is hereby incorporated by reference herein in its entirety.

TECHNICAL FIELD

This patent application relates to flameproof and fire resistant materials, wearables, and equipment according to example embodiments, and more specifically to flameproof material for wearables, personal protective equipment, lithium-ion battery flame protection, and general flame protection.

COPYRIGHT

BACKGROUND

Workers who have a high risk of contact with direct flame and high-temperatures (e.g., firefighters, stunt professionals, metal and foundry workers, race car drivers, etc.) and other workers who work in environments that are exposed to the danger of fires require fire-protective clothing having excellent durability and flame resistance. In some cases, fire-protective clothing usually includes an aramid fiber (e.g., a heat-resistant fiber) having high strength and flame resistance, which is used in a fabric for making fire-protective clothing. Some conventional fire-protective fabrics use a woven fabric including a para-aramid fiber in an amount of about 40% to 70% and a meta-aramid fiber in an amount of about 10% to about 40% as an outer shell woven fabric for use in firefighter fire-protective clothing. Other conventional fire-protective clothing uses a fabric made from a yarn including a meta-aramid fiber in an amount of 50 to 80 (% by weight) and a para-aramid fiber in an amount of 0 to 5 (% by weight) as a fabric suitable for use in fire protection. However, the conventional fire-protective fabrics use an aramid fiber at a high blending ratio. A high blending ratio of an aramid fiber results in increases in product prices and thus constitutes an obstacle to the spread of safe products. Additionally, the conventional fire-protective fabrics cannot achieve a level of effectiveness to assure the safety of the personnel using the fire-protective clothing.

SUMMARY

The example embodiments of the disclosed flameproof material for wearables, personal protective equipment, lithium-ion battery flame protection, and general flame protection relate to the creation of a flameproof material combination (a flameproof shell). The flameproof shell serves to enable the fabrication of different types of wearables and personal protective equipment for workers who have a high risk of contact with direct flame and high-temperatures (e.g., firefighters, stunt professionals, metal and foundry workers, race car drivers, etc.). Additionally, the example embodiments disclosed herein can also be used in electric vehicle (EV) industries, aerospace, construction, and other industries and applications.

In various example embodiments, the flameproof shell disclosed herein can be used in various applications including:

Flameproof enclosures for lithium batteries (e.g., for electric vehicles, electric transportation ships, aircraft, energy storage, battery storage and recycling, etc.), and high-temperature furnaces (smelting, melting, metal formation, fire-test sites, etc.); (See FIG. 27 and FIG. 28)

Flameproof solutions for walls, doors, etc. in construction industry; (See FIG. 30)

Aeronautics and space industries; (See FIG. 29)

Wearables and personal protective equipment for workers who have a high risk of contact with direct flame and high-temperatures (e.g., firefighters, stunt professionals, metal and foundry workers, race car drivers, etc.);

Fire and temperature protection wearables for military personnel, as well as fire and temperature protection for military machinery and equipment, and armament boxes and storage; (See FIG. 26) and Flameproof wraps for high-voltage lines, poles, generator systems and infrastructure. (See FIG. 25)

Details of example embodiments of the disclosed flameproof material for wearables, personal protective equipment, lithium-ion battery flame protection, and general flame protection are provided below.

BRIEF DESCRIPTION OF THE DRAWINGS

The various embodiments are illustrated by way of example, and not by way of limitation, in the figures of the accompanying drawings in which:

FIG. 1 illustrates a legend showing each of five material layers used in the flameproof shell of the example embodiments and associated with shading patterns as shown in the subsequent figures;

FIG. 2 illustrates a method step of an example embodiment wherein layers 1, 2, 4, and 5 are cut or otherwise partitioned into garment patterns;

FIGS. 31 and 32 illustrate process flow diagrams that show example embodiments of methods as described herein.

DETAILED DESCRIPTION

Figure 3:
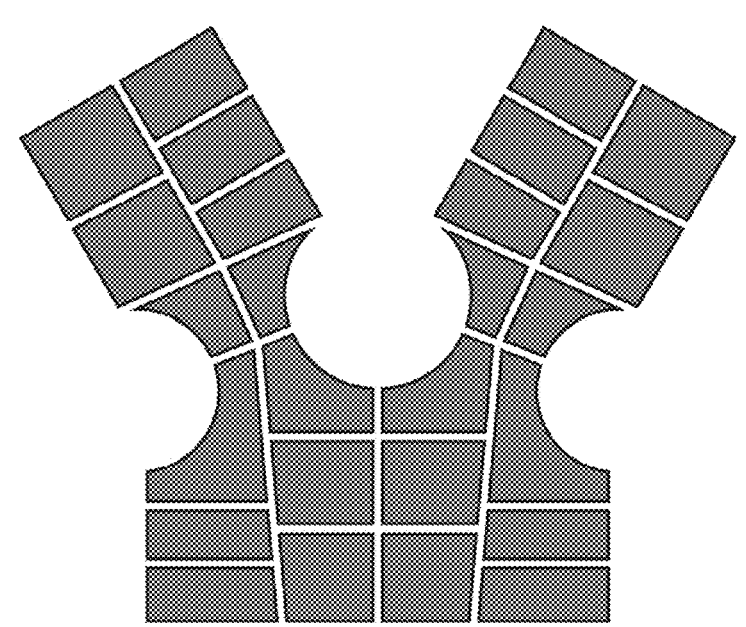
FIG. 3 illustrates a method step of an example embodiment wherein layer 3 is cut or otherwise partitioned into individually shaped pieces.
Figure 4:
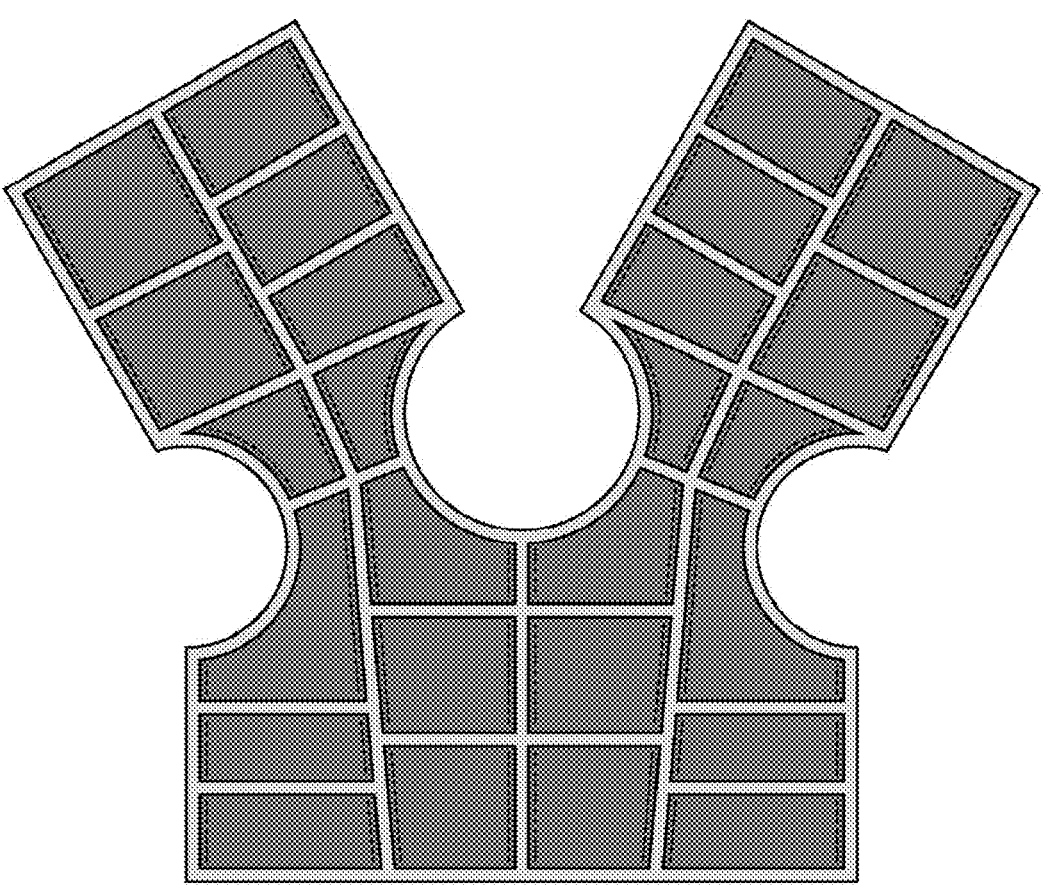
FIG. 4 illustrates a method step of an example embodiment wherein individually shaped pieces of layer 3 are linked to pre-cut layer 4 using a fastener, such as aramid thread or other fire-resistant fiber.
Figure 5:
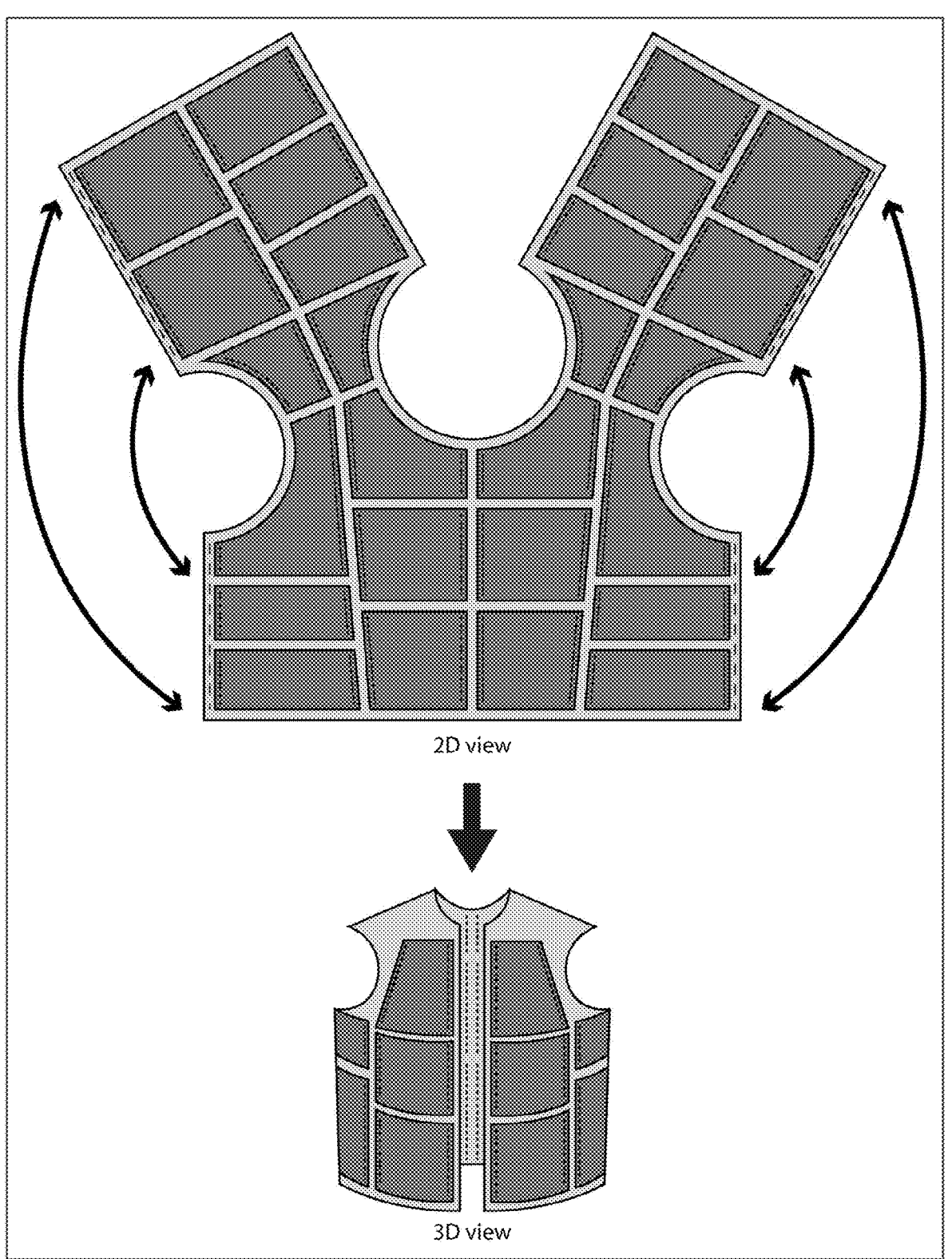
FIG. 5 illustrates a method step of an example embodiment wherein layer 4 together with attached layer 3 is assembled as a garment by attaching the sides together with a fastener, such as aramid thread or other fire-resistant fiber.
Figure 6:
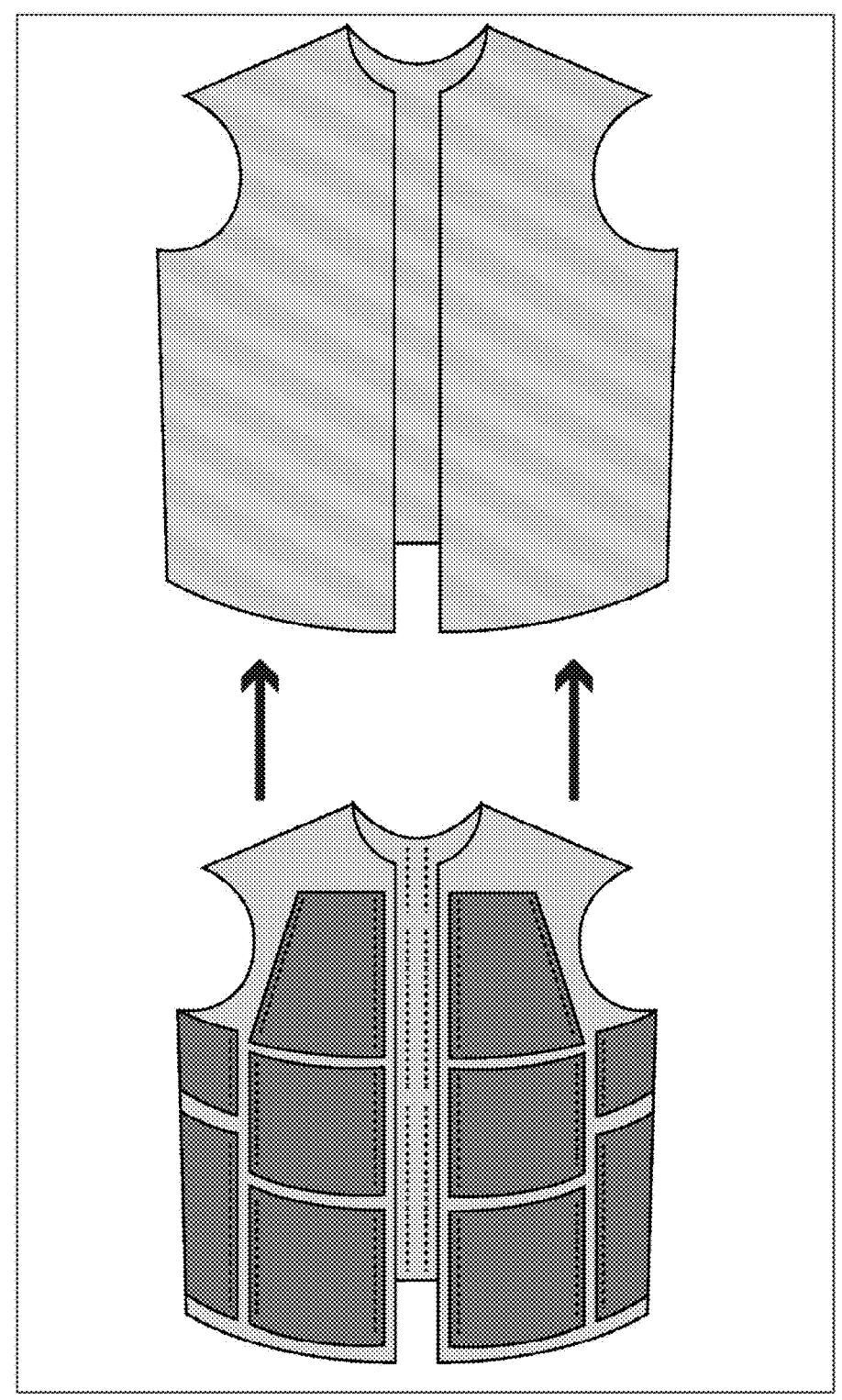
FIGS. 6 and 7 illustrate a method step of an example embodiment wherein the pre-assembled garment from layer 2 is placed on top of the pre-assembled garment from layers 4 and 3 and attaching the open edges together with a fastener, such as aramid thread or other fire-resistant fiber.
Figure 7:
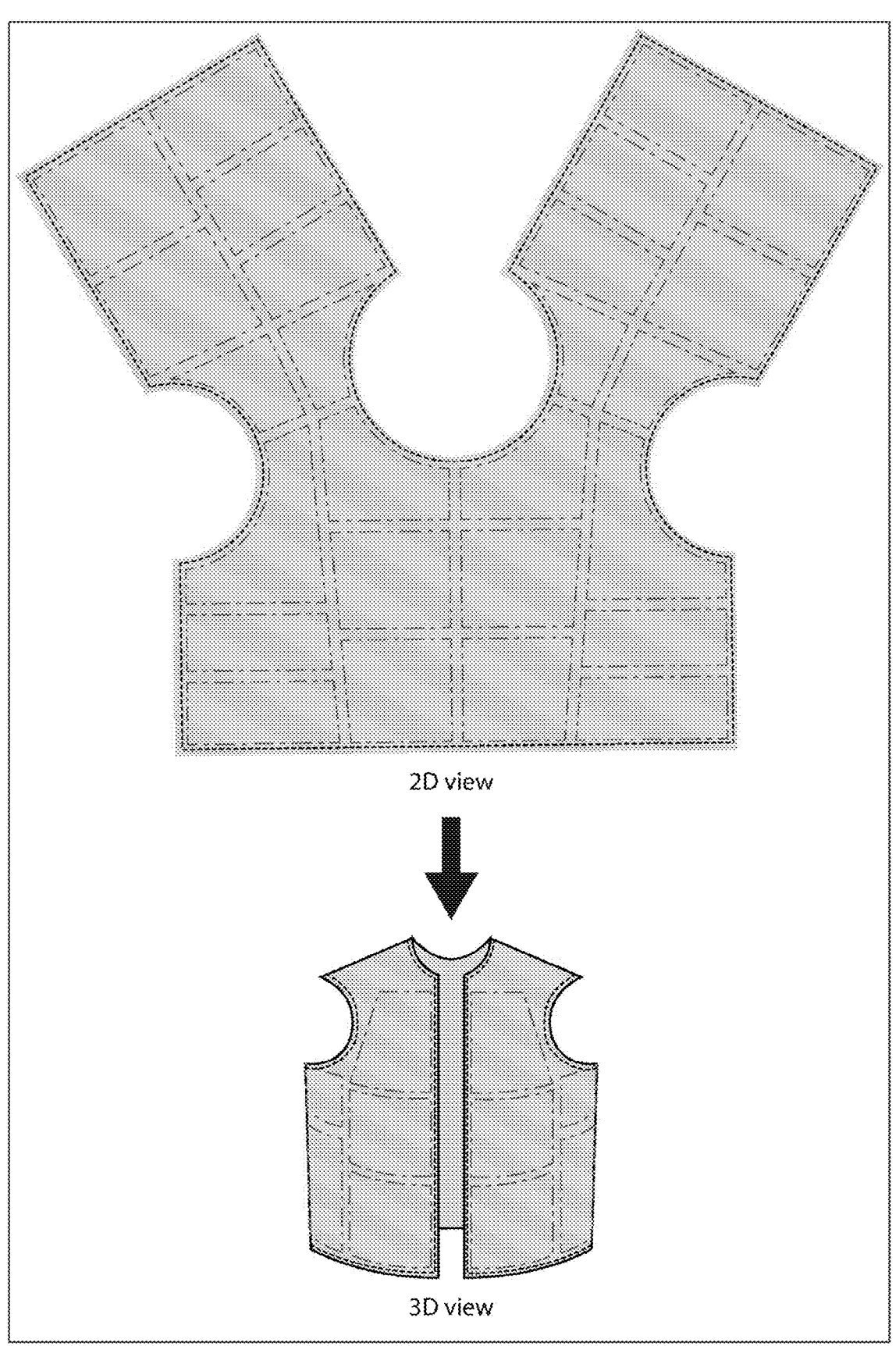
Figure 8:
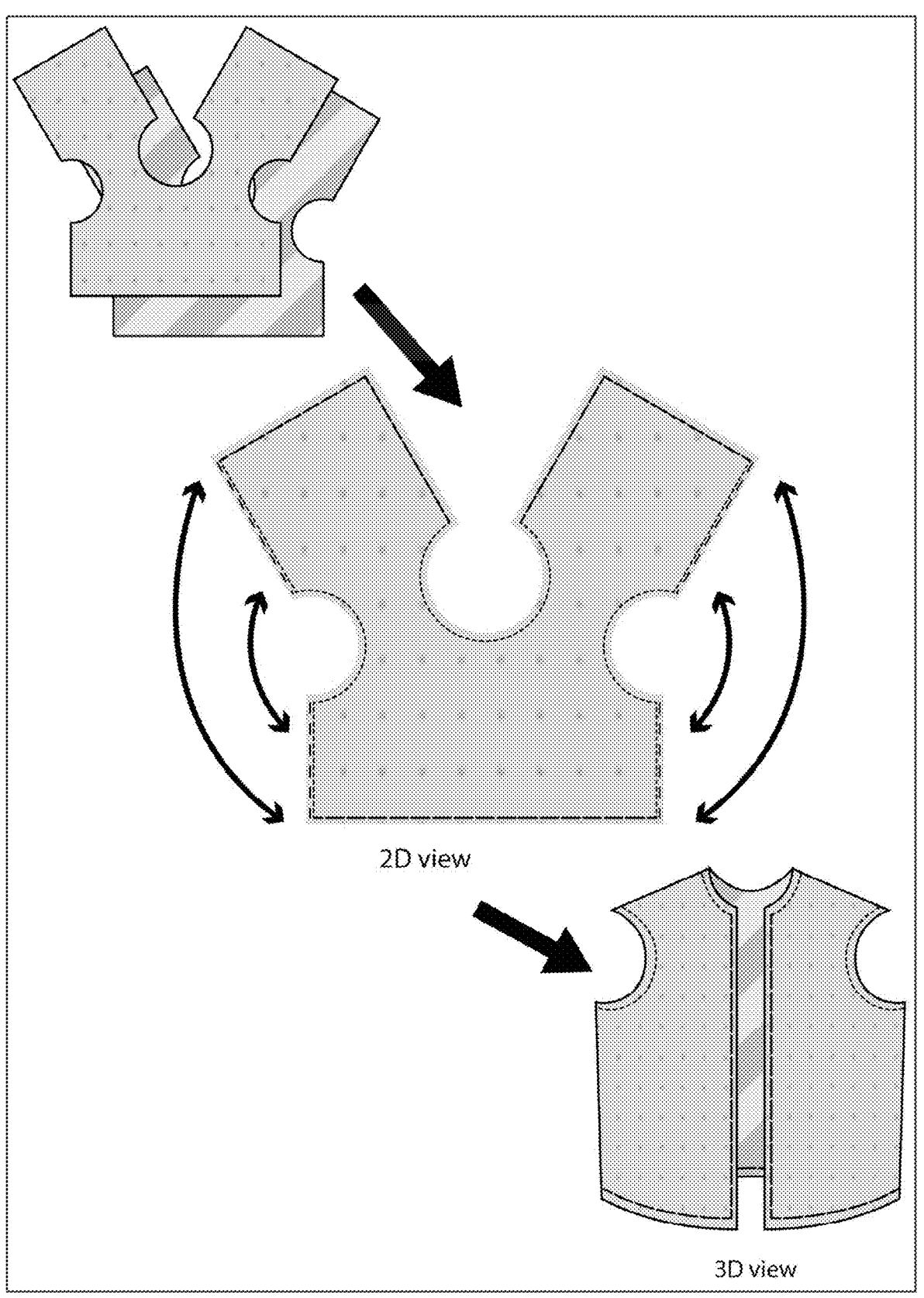
FIG. 8 illustrates a method step of an example embodiment wherein the pre-cut layer 1 and an optional moisture wicking layer are placed together edge to edge, and sewn into a separate garment at the overlapping edges, except for the open edges defined for a specific garment.
Figure 9:
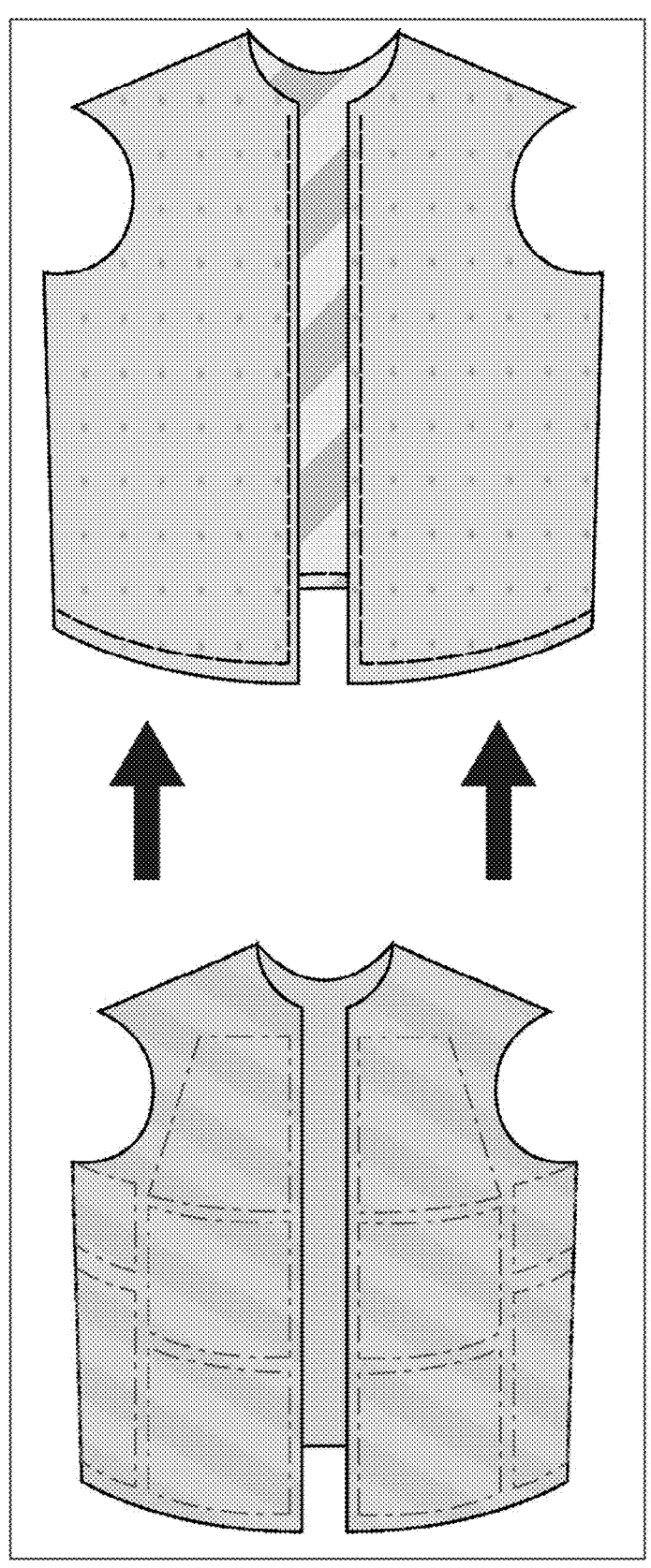
FIG. 9 illustrates a method step of an example embodiment wherein open edges left unsewn in the layer 1 and an optional moisture wicking layer are used to place the pre-assembled garment from layers 2, 3, and 4 into the pre-assembled garment from layer 1 and the optional moisture wicking layer.
Figure 10:
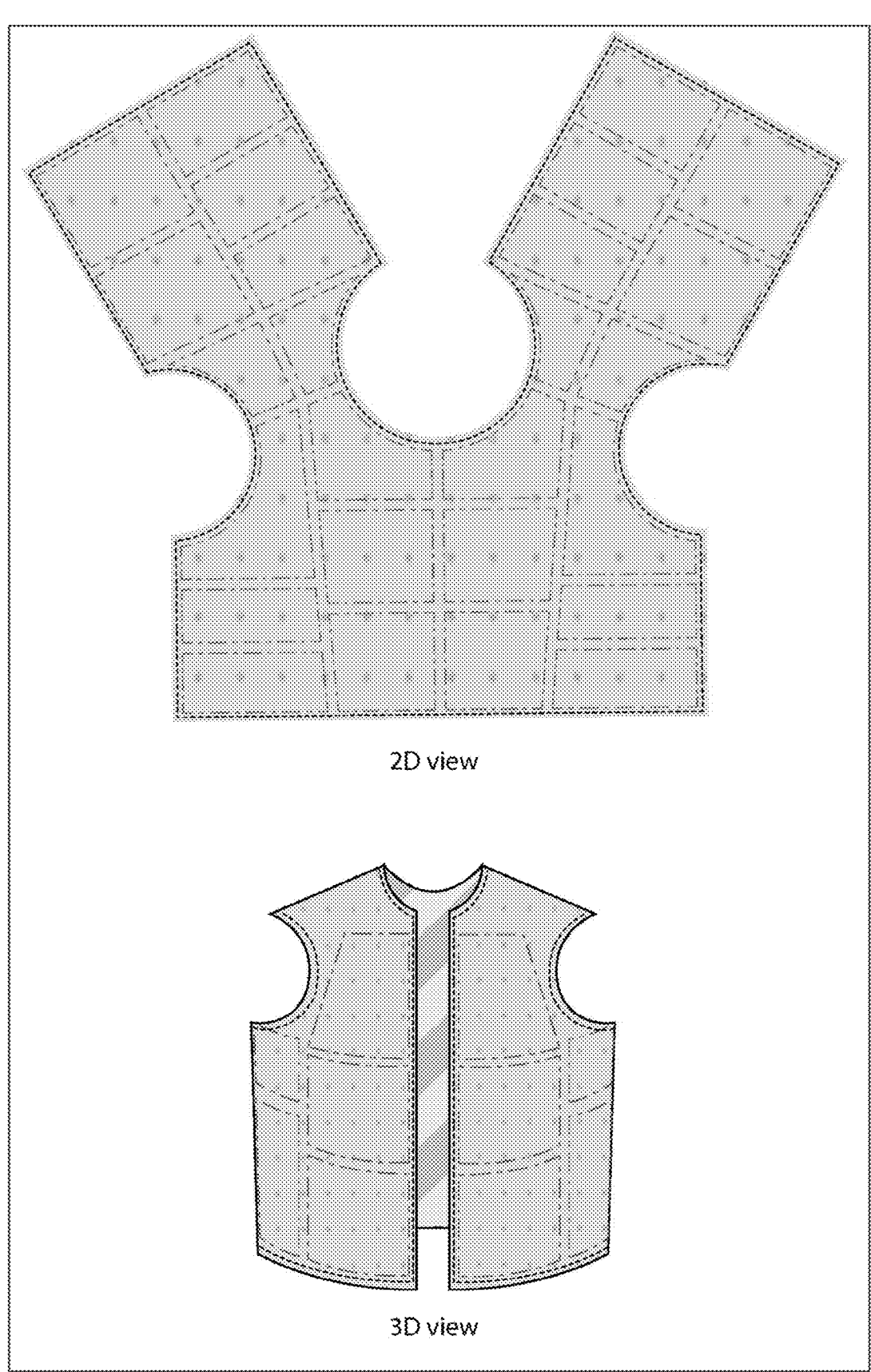
FIG. 10 illustrates a method step of an example embodiment wherein, in the case of fabricating a one-piece (insepa-rable) garment, pre-assembled layer 1 and an optional mois-ture wicking layer and pre-assembled layers 2, 3, and 4 are connected to one another at all the edges (including open edges) using a fastener, such as aramid thread or other fire-resistant fiber.
Figure 11:
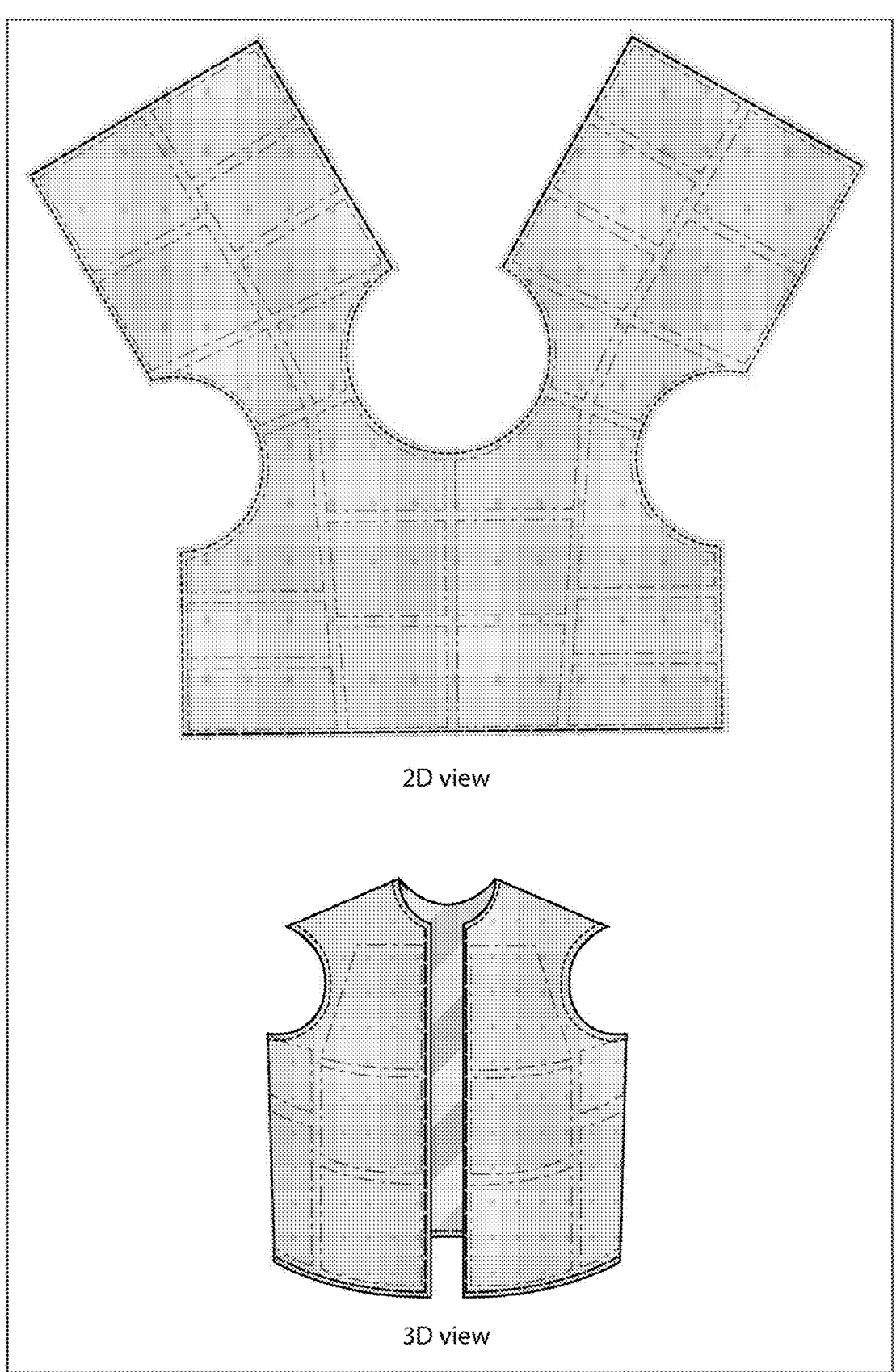
FIG. 11 illustrates a method step of an example embodi-ment wherein, in the case of fabricating a separable garment, where pre-assembled layers 2, 3, and 4 are removable from the pre-assembled layer 1 and an optional moisture wicking layer, the pre-assembled layer land the optional moisture wicking layer and the pre-assembled layers 2, 3, and 4 are connected to one another only at the open edges either using a separable fastener, such as zippers, knobs, hook and loop strips (e.g., Velcro™ strips), or magnets.
Figure 12:
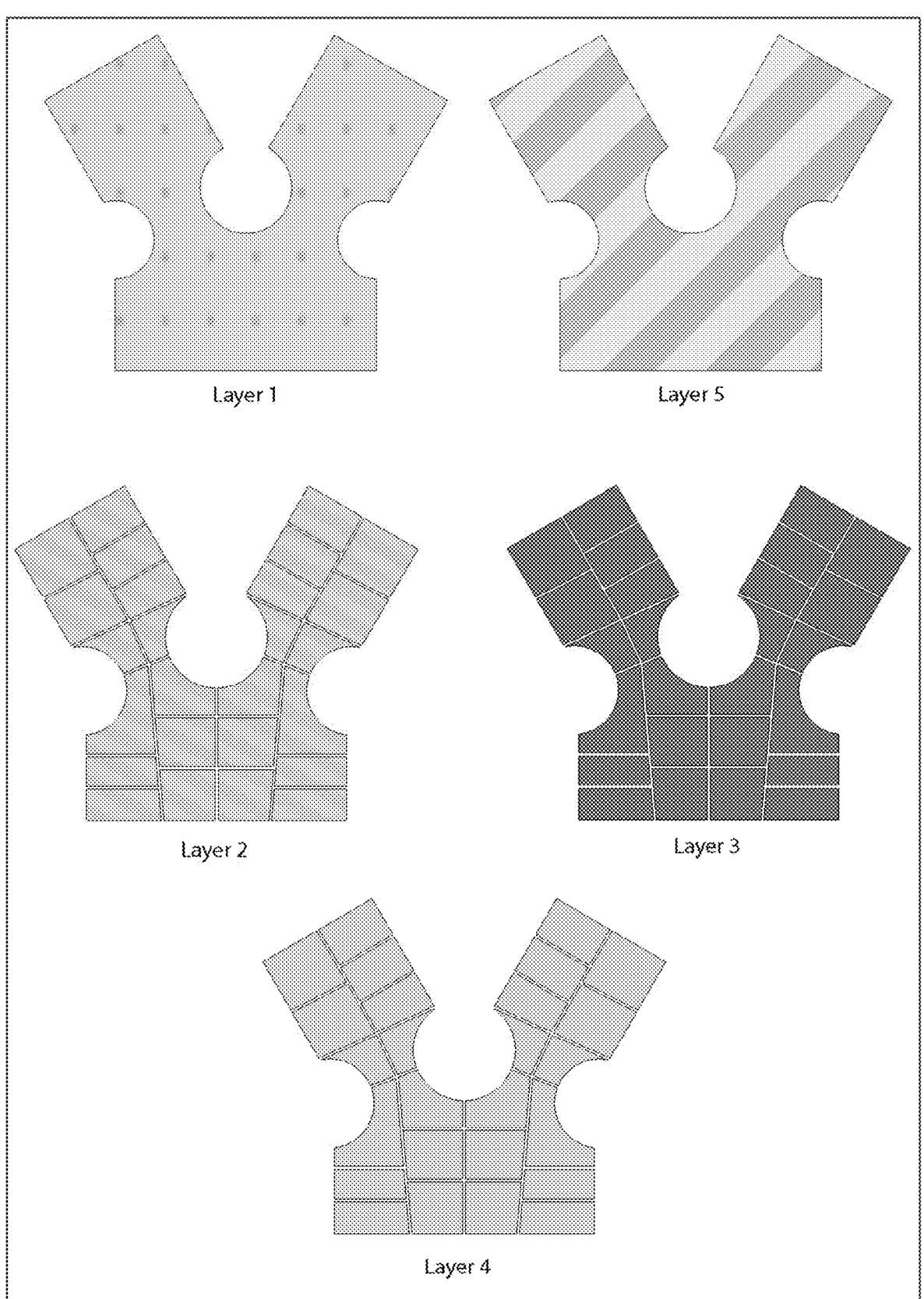
FIG. 12 illustrates a method step of an example embodi-ment wherein layers 1, 2, 3, 4, and 5 are cut or otherwise partitioned into predefined shapes.
Figure 13:
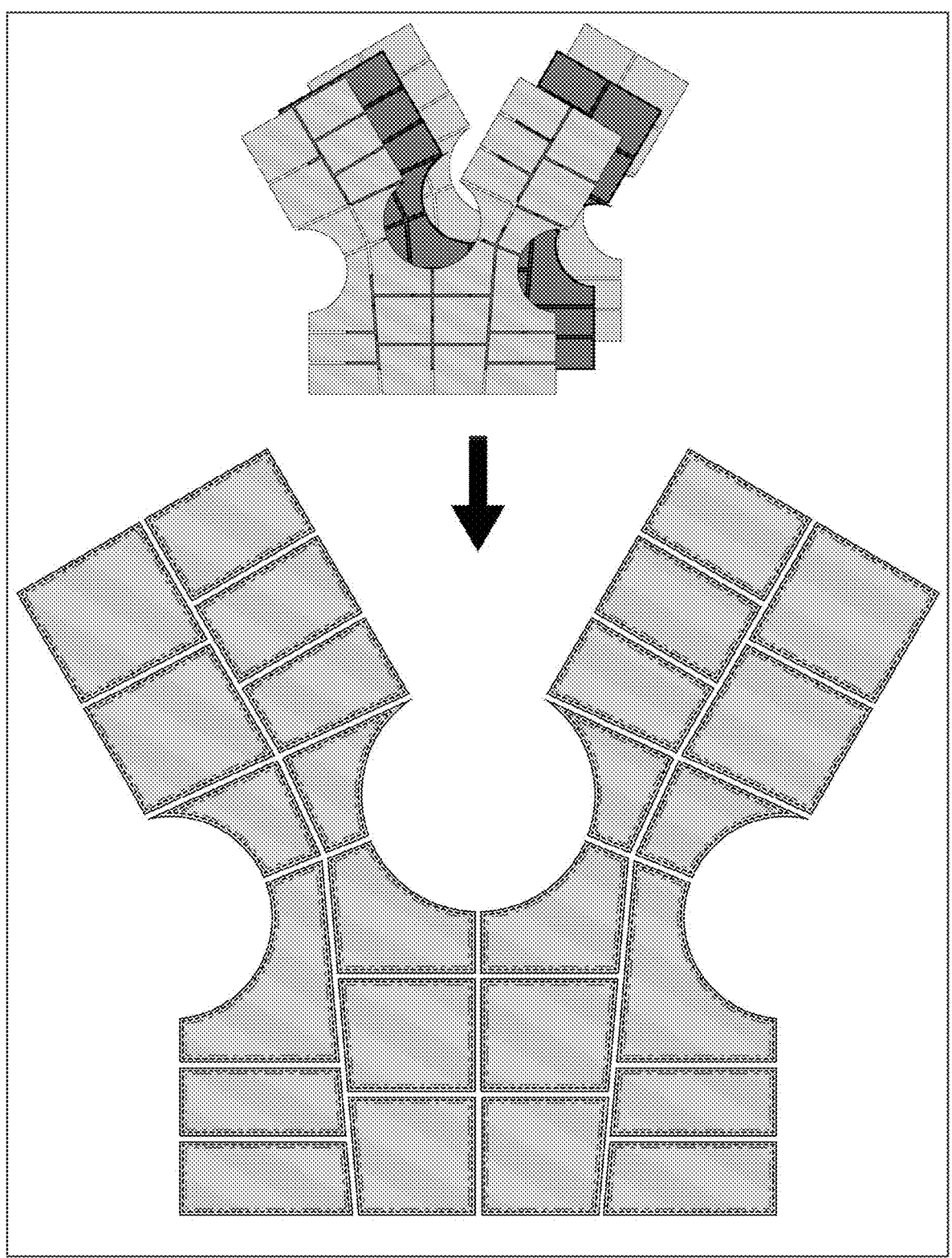
FIG. 13 illustrates a method step of an example embodi-ment wherein layers 2, 3, and 4 are aligned together in the same order and attached into individual pieces, along all the edges using a fastener, such as aramid thread or other fire-resistant fiber.
Figure 14:
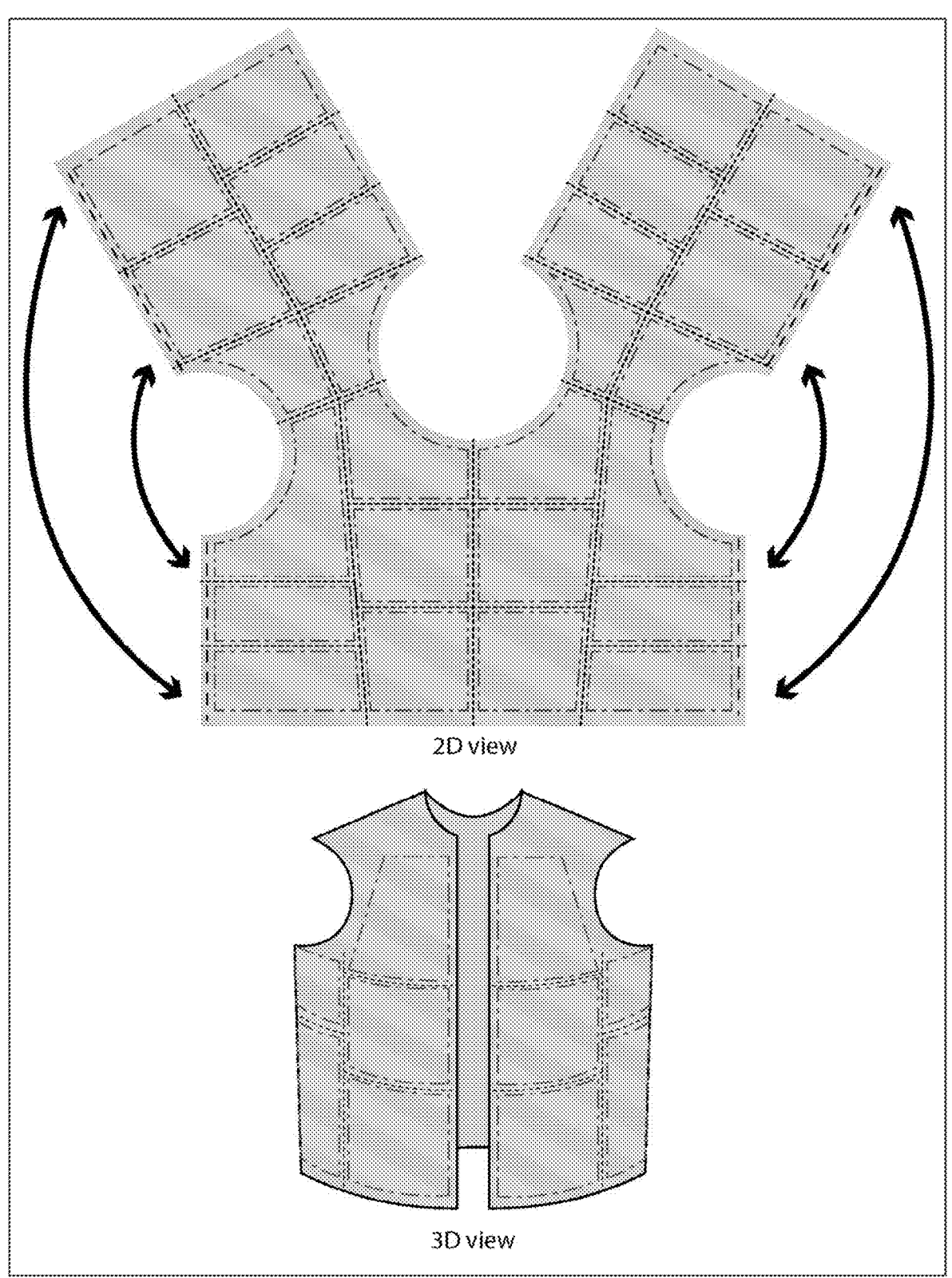
FIG. 14 illustrates a method step of an example embodi-ment wherein individual pieces are placed in their respective places, as the individual pieces (with layers 2, 3, and 4) fit each other like a jigsaw puzzle, and attached together on all the overlapping edges using a fastener, such as aramid thread or other fire-resistant fiber, and assembled as a garment, by attaching the sides together with aramid thread or other fire-resistant fiber.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, flameproof material for wearables, personal protective equipment, lithium-ion battery flame protection, and general flame protection are disclosed. Referring to FIG. 1, a Legend is disclosed, which identifies a shading pattern associated with each of the five material layers used in an example embodi-ment of the flameproof material for wearables. In addition, the Legend of FIG. 1 shows a pattern associated with the stitching, assembly, outlines, and edges of the flameproof material for wearables. These patterns are shown in the subsequent figures provided herein to illustrate the compo-sition and manufacturing processes used in the example embodiment of the flameproof material for wearables dis-closed herein. Details of these composition and manufac-turing processes used in the example embodiments of the disclosed flameproof material for wearables, personal pro-tective equipment, lithium-ion battery flame protection, and general flame protection are provided below.

Composition of the Flameproof Material of Various Example Embodiments

Referring again to FIG. 1, the flameproof shell of the example embodiments is comprised of several layers of materials, arranged in a specific order, and linked or bonded to (or configured for bonding with) each other in a specific manner. The list and order of the layers of materials for an example embodiment is listed in Table 1 (see below) from the external side (flame side) to the internal side (skin side). In various example embodiments, the layers of the flame-proof shell can be arranged as follows:

1. Layer One (the layer facing flame or source of heat): see the list of materials used as Layer 1 in Tables 1, 2A, and 2B.
2. Layer Two: see the list of materials used as Layer 2 in Tables 1, 2A, and 2B.
3. Layer Three: see the list of materials used as Layer 3 in Tables 1, 2A, and 2B.
4. Layer Four (Optional): see the list of materials used as Layer 4 in Tables 1, 2A, and 2B.
5. Layer Five (Optional)—see the list of materials used as Layer 5 in Tables 1, 2A, and 2B.
6. Adhesives, such as glue (Optional)—applied between the layers to fill out the air pockets and stick the layers together: see the list of materials used as the Glue in Tables 1, 2A, and 2B.

The composition of these layers of materials is also listed below as Material 1 through Material 7 with Material 1 being the external side material and Material 7 being the skin side material. Additionally, the example embodiments can optionally include a Material 6, which serves as a moisture wicking barrier/layer. Each of these layers of materials is described below and associated with shading patterns as shown in FIG. 1—Legend.

As disclosed herein, the references to specific materials, various acronyms, and abbreviations are defined, explained, and detailed as follows:

1. O-PAN—or Oxidized PAN—Oxidized Polyacryloni-trile—a type of a synthetic Fire-resistant (FR) fiber.
2. P-aramid—or Para-aramid—Para-aromatic polyamide fiber, a type of a synthetic Fire-resistant fiber.
3. PTFE—Polytetrafluoroethylene—a type of hydropho-bic (water-resistant) material.
4. PBI—Polybenzimidazole—a type of a synthetic Fire-resistant fiber, with especially high decomposition tem-perature.

5. FR-rayon—Rayon (Rayon is a semi-synthetic fiber, made from natural sources of regenerated cellulose, such as wood and related agricultural products—also called Viscose) treated with fire-resistant (FR) chemicals.

The flameproof shell of the example embodiments disclosed herein can be manufactured in at least two different configurations as described below:

1. A 4-layer configuration (all four layers are used during manufacturing)—See Table 2A; or
2. A 3-layer configuration (only Layer 1, Layer 2, and Layer 3 are used during manufacturing)—See Table 2B.

An additional layer 5 can be added to the 4-layer configuration for wearable products for comfort of the customer; but, layer 5 has no effect on the flame and heat resistance of the flameproof shell, and hence is an optional layer. Nevertheless, Layer 5 can become a part of the manufacturing process and so will be described below in connection with the disclosed manufacturing methodology.

Manufacturing Methods for the Flameproof Material of Various Example Embodiments with or without Adhesives Referring now to FIGS. 2 through 16, the flameproof shell of the example embodiments can be fabricated using the manufacturing methods disclosed below. When assembled, the flameproof shell of the example embodiments is semi-flexible and does not behave as a typical all-fabric combination based garment might behave. Thus, conventional clothing or garment manufacturing and sewing techniques are inadequate for fabricating the flameproof shell of the example embodiments into a wearable flameproof garment. This fabrication issue is solved by designing an armor comprised of a plurality of (e.g., over 300) individually shaped pieces. Then, this plurality of pieces is assembled into a wearable flameproof garment using one or more of the various manufacturing methods as described in detail below.

During manufacture of the flameproof shell of the example embodiments, different materials can be used as different layers. See Tables 2A and 2B for a description of the types of combinations of layers and materials that can be used. For the manufacture of wearable garments, a Layer Five can be added (towards the skin side of the garment), which is not a required part of the flameproof shell of the example embodiments, and serves as a Moisture Management and Ventilation Layer. See Table 1 for materials used as a Moisture Management and Ventilation Layer.

When fabricating the flameproof shell of the example embodiments, glue or other adhesives can be either added or not added between the layers, depending on the specificity of the target application. The material and layer configurations described in Tables 2A and 2B can be manufactured with or without using glue or other adhesives between different layers. The presence of glue or other adhesives between the layers is denoted as a symbol—(G) in this disclosure. For example, various layer configurations using glue or other adhesives can include: 1G2G4G3 (glue between every layer), 12G4G3 (glue between two layers), 1G243 (glue on a single layer), etc. Various configurations of the example embodiments can be fabricated as disclosed herein (see Tables 2A and 2B), but with different glue content or the absence of glue or other adhesives.

Method 1 for assembling an entire wearable flameproof garment of an example embodiment includes the following method steps:

1. Layers 1, 2, 4, and 5 (the optional moisture management and ventilation layer) are cut or otherwise partitioned into garment patterns or application-specific portions (See FIG. 2).
2. Layer 3 is cut or otherwise partitioned into individually shaped pieces (See FIG. 3). Note that the shapes shown in the figures are demonstrative examples and can be fabricated in a variety of different designs using the techniques disclosed herein.
3. (Either/Or step) These pieces are placed and linked or bonded to pre-cut Layer 4 using aramid (e.g., Kevlar or Nomex) thread (See FIG. 4) or bonded using an adhesive (e.g., glue), which is prepared and applied as a thin layer to these pieces to the side facing Layer 4.
4. Layer 4 together with attached Layer 3 is assembled as a garment by attaching the sides together with a fastener, such as aramid thread (or other fire-resistant fiber) (See FIG. 5).
5. (Optional step) An adhesive (e.g., glue) is prepared and applied as a thin layer to the pre-assembled garment from Layer 2, to the side facing Layers 3 and 4 (to the internal side of the Layer 2 garment).
6. The pre-assembled garment from Layer 2 is placed on top of the pre-assembled garment from Layers 4 and 3 and sewn at the open edges (e.g., wrist collars, neck collar, ankle collars, waist or hip line, and other free hanging cut edges) using aramid (e.g., Kevlar or Nomex) thread (See FIGS. 6 and 7).
7. Pre-cut Layer 1 and an optional Layer 5 moisture management and ventilation layer are placed together edge to edge, and sewn into a separate garment at the overlapping edges, except for the open edges defined for a specific garment, e.g., jacket front zipper and lower end area as shown in the figures (See FIG. 8).
8. Open edges left unsewn in the Layer 1 and the optional Layer 5 moisture management and ventilation layer are used to place the pre-assembled garment from Layers 2, 3, and 4 into the pre-assembled garment from Layer 1 and the optional Layer 5 moisture management and ventilation layer (See FIG. 9).
9. In the case of fabricating a one-piece (inseparable) garment, pre-assembled Layers 1 and the optional Layer 5 moisture management and ventilation layer and pre-assembled Layers 2, 3, and 4 are connected to one another at all the edges (including open edges) using aramid (e.g., Kevlar or Nomex) thread (See FIG. 10).
10. In the case of fabricating a separable garment, where pre-assembled Layers 2, 3, and 4 are removable from pre-assembled Layer 1 and the optional Layer 5 moisture management and ventilation layer, the pre-assembled Layer 1 and the optional Layer 5 moisture management and ventilation layer and pre-assembled Layers 2, 3, and 4 are connected to one another only at the open edges either using a separable fastener, such as zippers, knobs, Velcro™ strips, or magnets (See FIG. 11).

Method 2 for assembling an entire wearable flameproof garment of an example embodiment includes the following method steps:

1. Layers 1, 2, 3, 4, and 5 (the optional moisture management and ventilation layer) are cut or otherwise partitioned into predefined shapes (See FIG. 12).
2. (Optional step) An adhesive (e.g., glue) is prepared and applied as a thin layer to pieces to either or both sides of Layer 3.
3. Layers 2, 3, and 4 are aligned together in the same order and sewn into individual pieces, along all the edges using aramid (e.g., Kevlar or Nomex) thread (See FIG. 13). In the case of fabricating a single piece, Layer 1 is added on the free side of Layer 2 and sewn with the same suture.

4. Individual pieces are placed in their respective places, as the individual pieces (with Layers 2, 3, and 4) fit each other like a jigsaw puzzle, and sewn together on all the overlapping edges using aramid (e.g., Kevlar or Nomex) thread and assembled as a garment, by attaching the sides together with a fastener, such as aramid thread or other fire-resistant fiber (See FIG. 14).

5. Pre-cut Layer 1 and the optional Layer 5 moisture management and ventilation layer are placed together edge to edge, and sewn into a separate garment at the overlapping edges, except for the open edges defined for a specific garment, e.g., jacket front zipper and lower end area as shown in the figures (See FIG. 8).

6. Open edges left unsewn in the Layer 1 and the optional Layer 5 moisture management and ventilation layer are used to place the pre-assembled garment from Layers 2, 3, and 4 into the pre-assembled garment from Layer 1 and the optional Layer 5 moisture management and ventilation layer (See FIG. 9).

7. In the case of fabricating a one-piece (inseparable) garment, pre-assembled Layer 1 and the optional Layer 5 moisture management and ventilation layer and pre-assembled Layers 2, 3, and 4 are connected to one another at all the edges (including open edges) using aramid (e.g., Kevlar or Nomex) thread (See FIG. 10).

8. In the case of fabricating a separable garment, where pre-assembled Layers 2, 3, and 4 are removable from pre-assembled Layer 1 and the optional Layer 5 moisture management and ventilation layer, the pre-assembled Layer 1 and the optional Layer 5 moisture management and ventilation layer and pre-assembled Layers 2, 3, and 4 are connected to one another only at the open edges either using a separable fastener, such as zippers, knobs, Velcro™ strips, or magnets (See FIG. 11).

Figure 15:
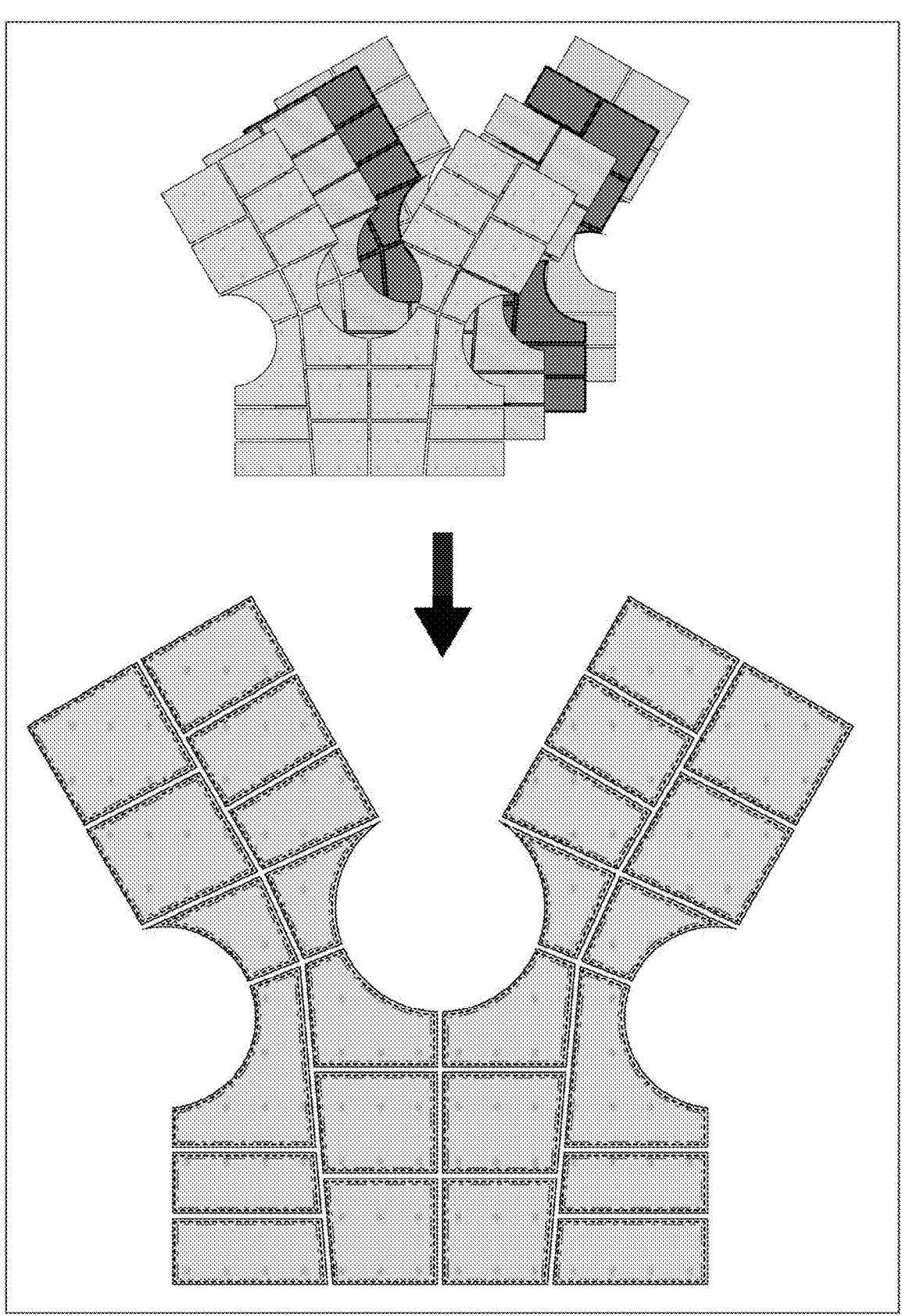
FIG. 15 illustrates a method step of an example embodi-ment wherein all four materials are connected together into individual pieces.

Method 3 for assembling an entire wearable flameproof garment of an example embodiment includes the following method steps:

1. Connect all four materials together into individual pieces as shown in FIG. 15, with or without using adhesives between layers 1 and 2, layers 2 and 3, and layers 3 and 4.

Figure 16:
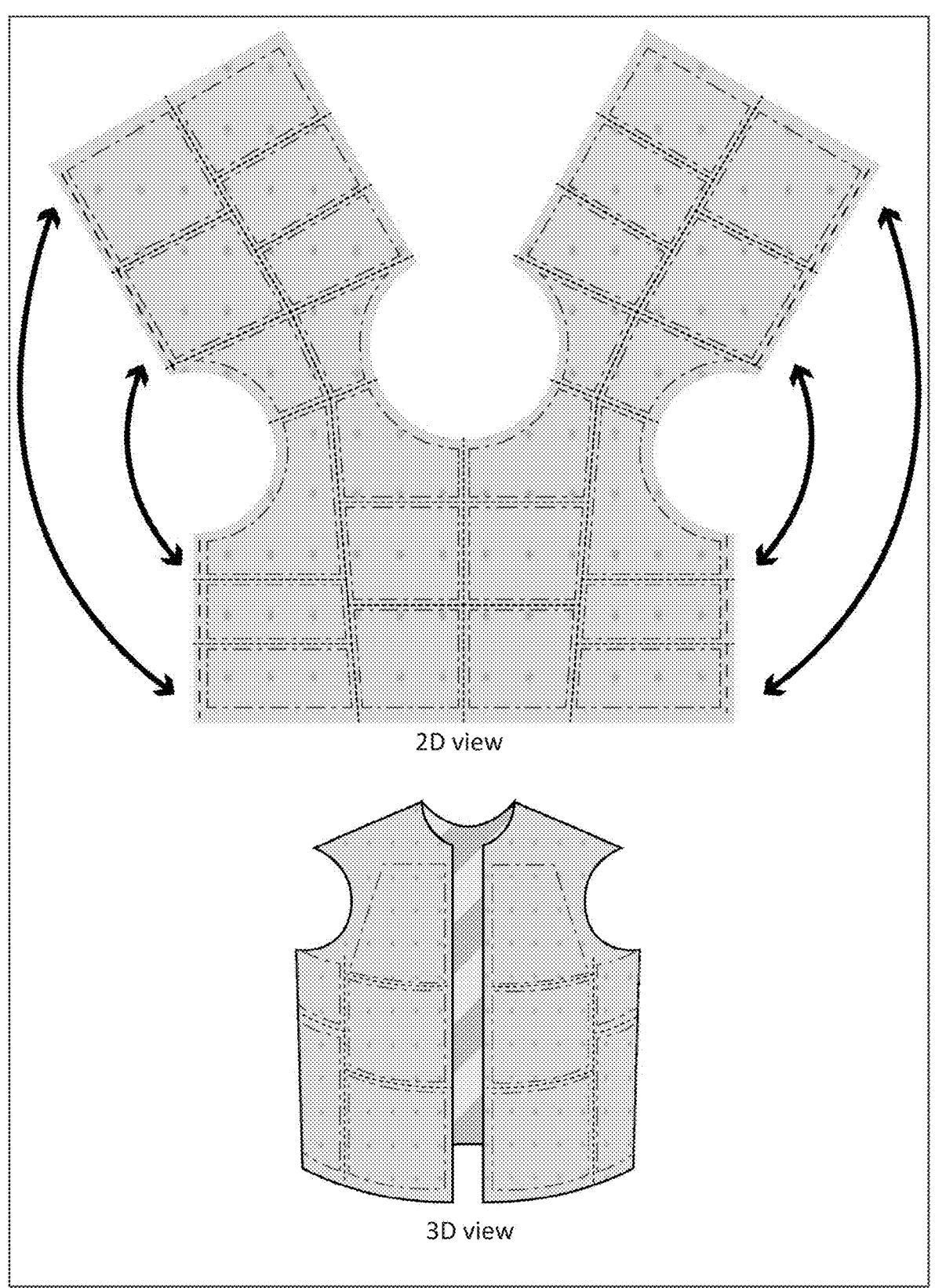
FIG. 16 illustrates a method step of an example embodi-ment wherein all pieces are assembled together into a garment.

2. Assemble all these pieces together into a garment as shown in FIG. 16.

Manufacturing Methods for a Three or Four Layer Flameproof Material of Various Example Embodiments with or without Adhesives for Non-Wearable Applications FIGS. 17 through 24 represent figurative designs. Both three-dimensional (3D) and two-dimensional (2D) shaped flameproof materials can be manufactured using the described methods.

Figure 17:
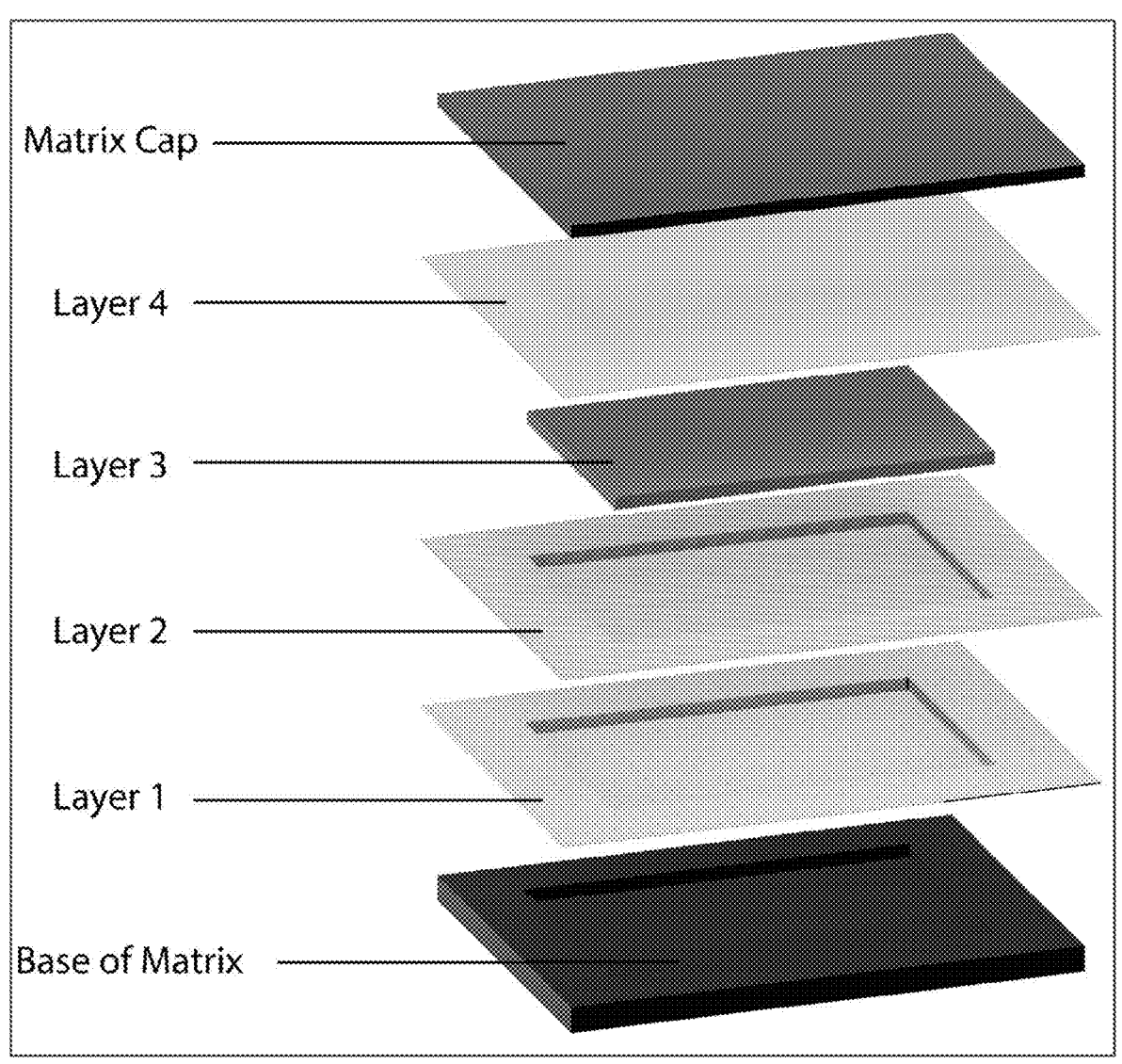
FIGS. 17 through 24 illustrate method steps of an example embodiment wherein a flameproof shell of the example embodiments can be fabricated using the manufacturing methods disclosed herein.
Figure 18:
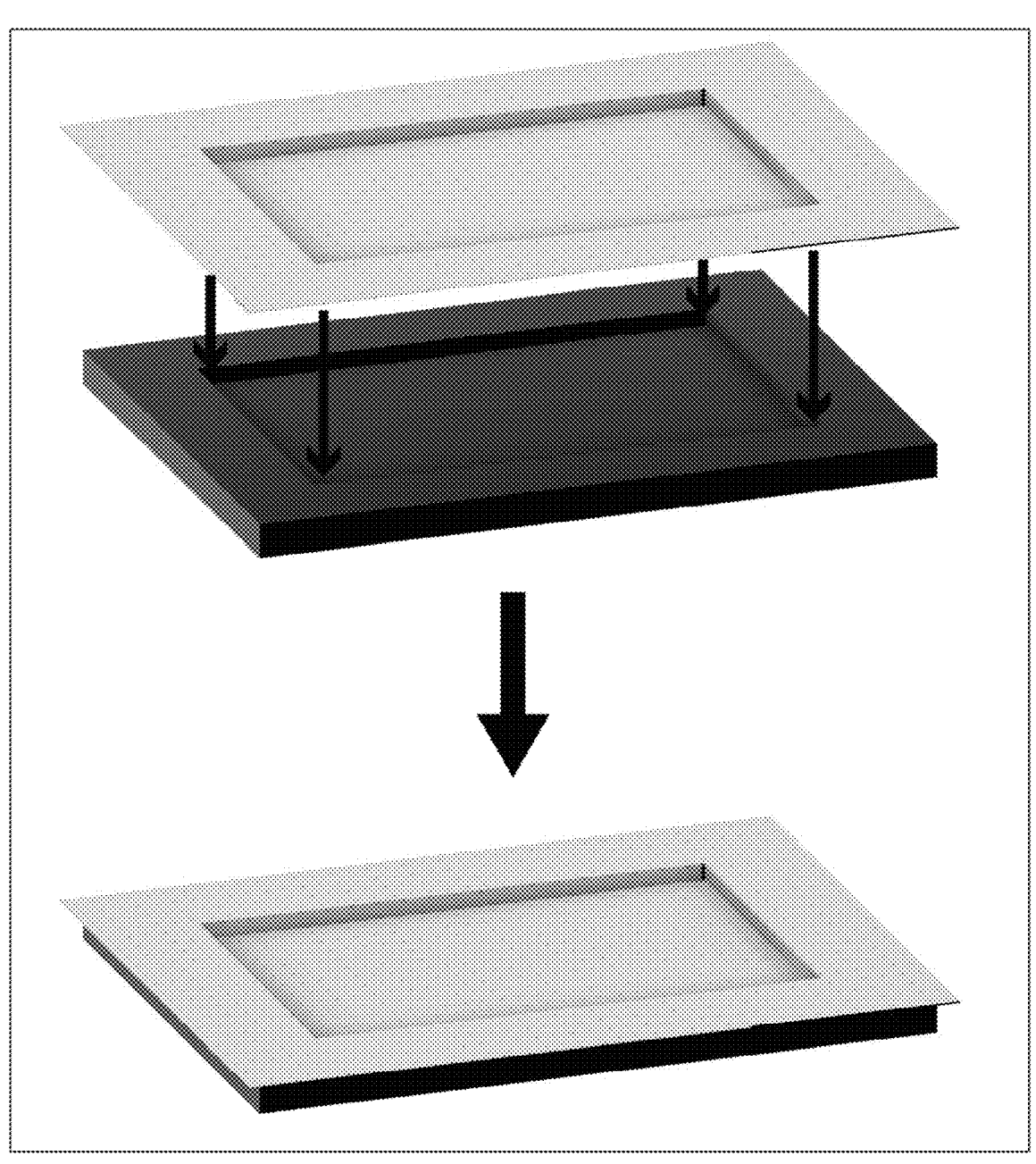
Figure 19:
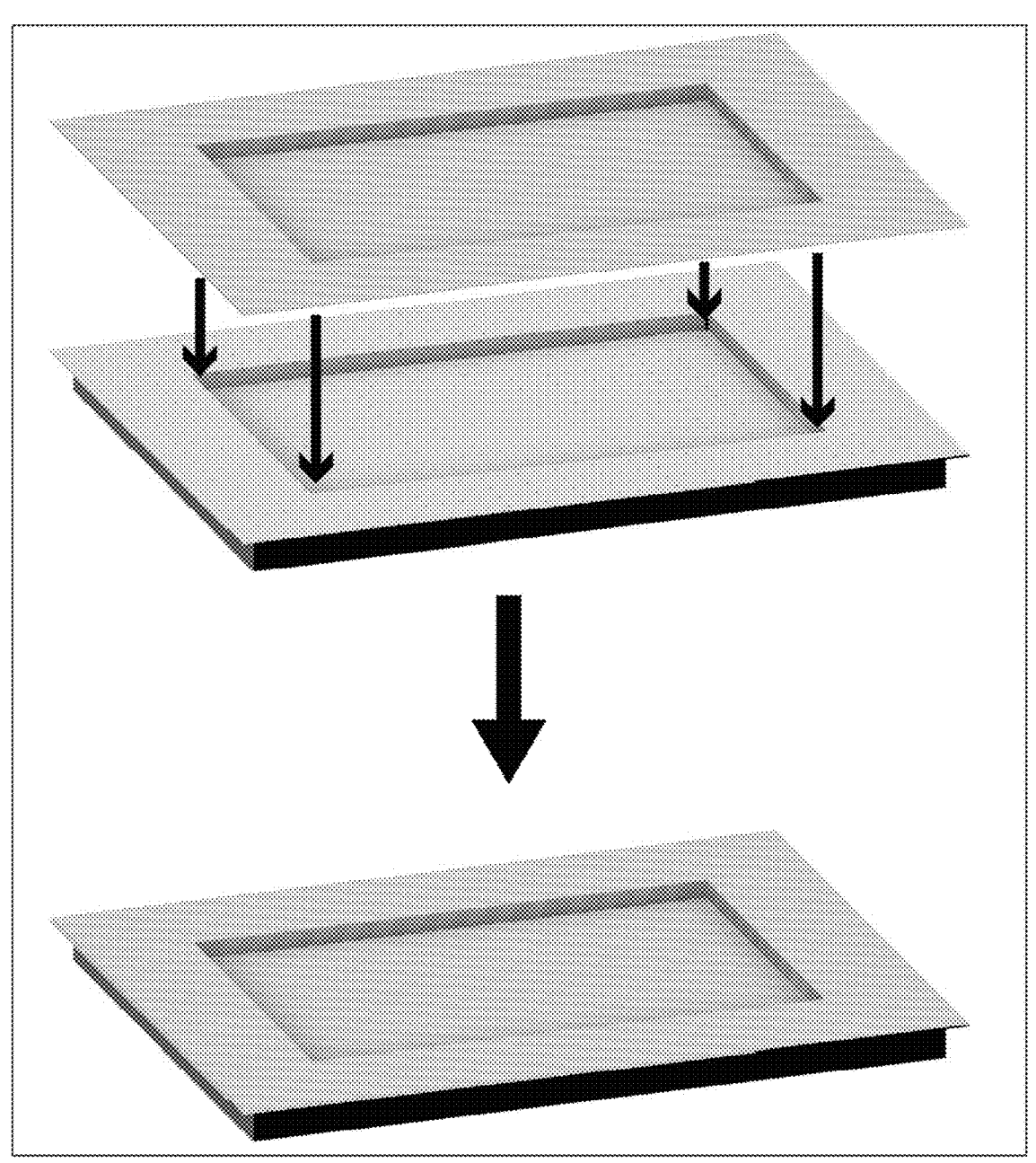
Figure 20:
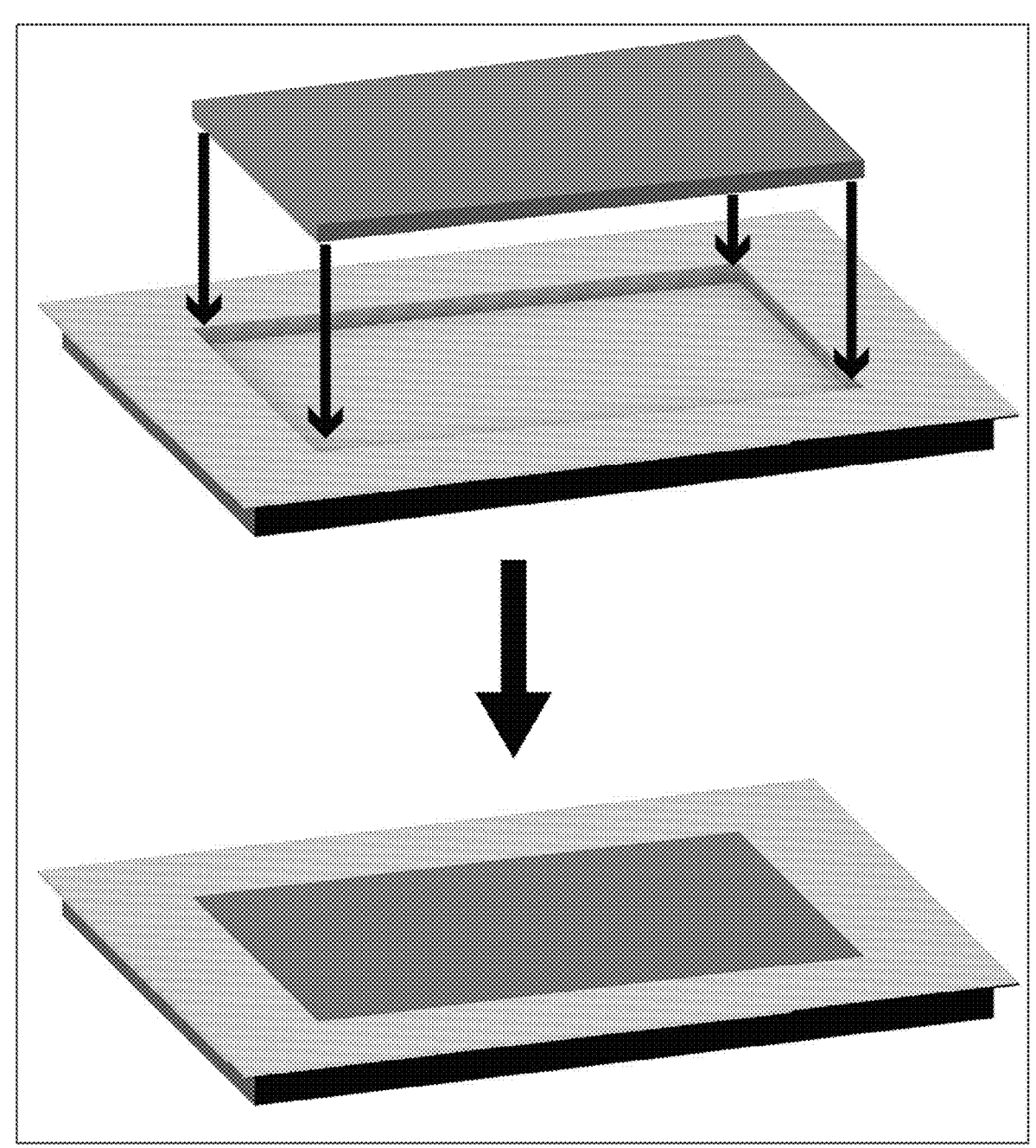
Figure 21:
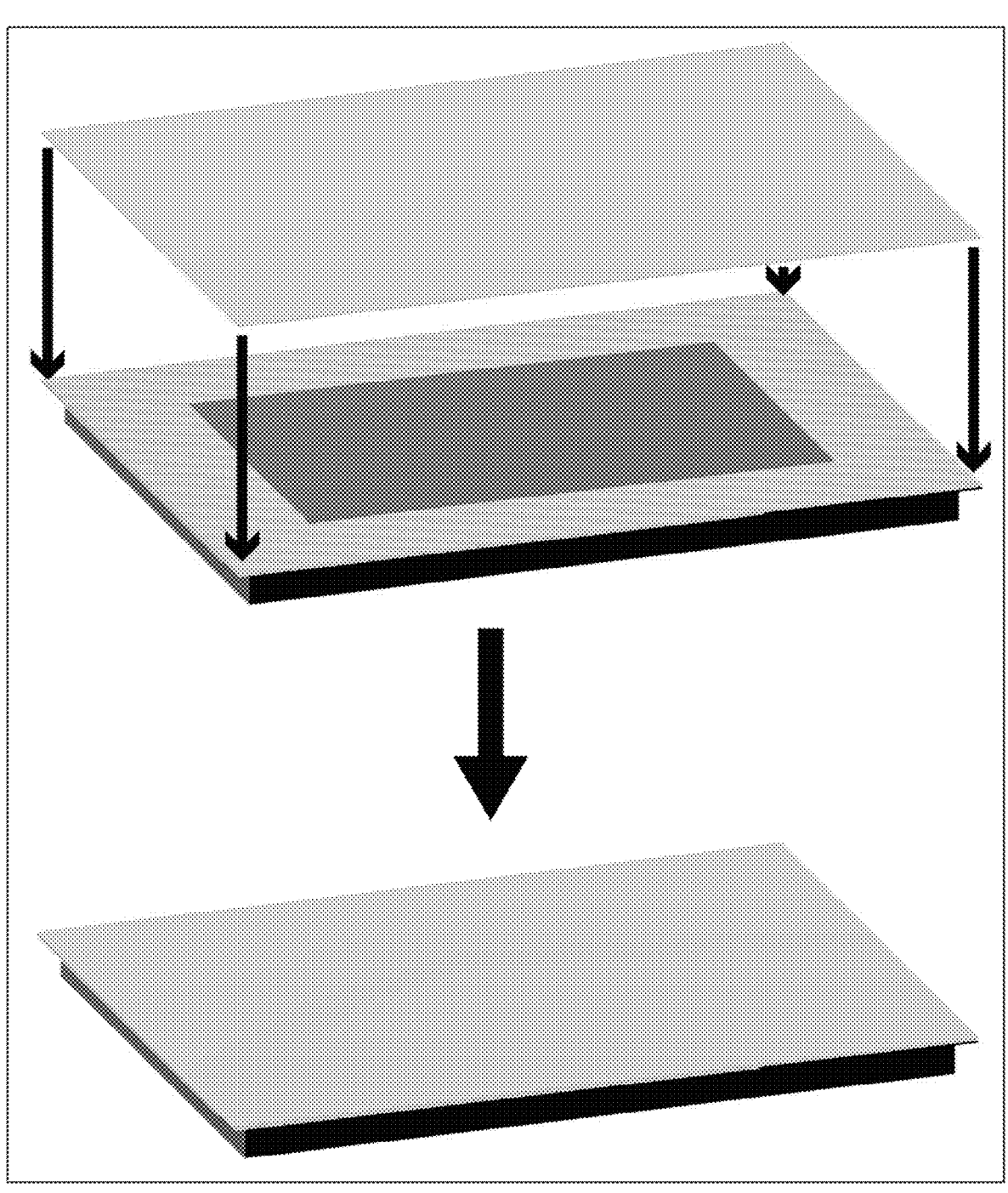
Figure 22:
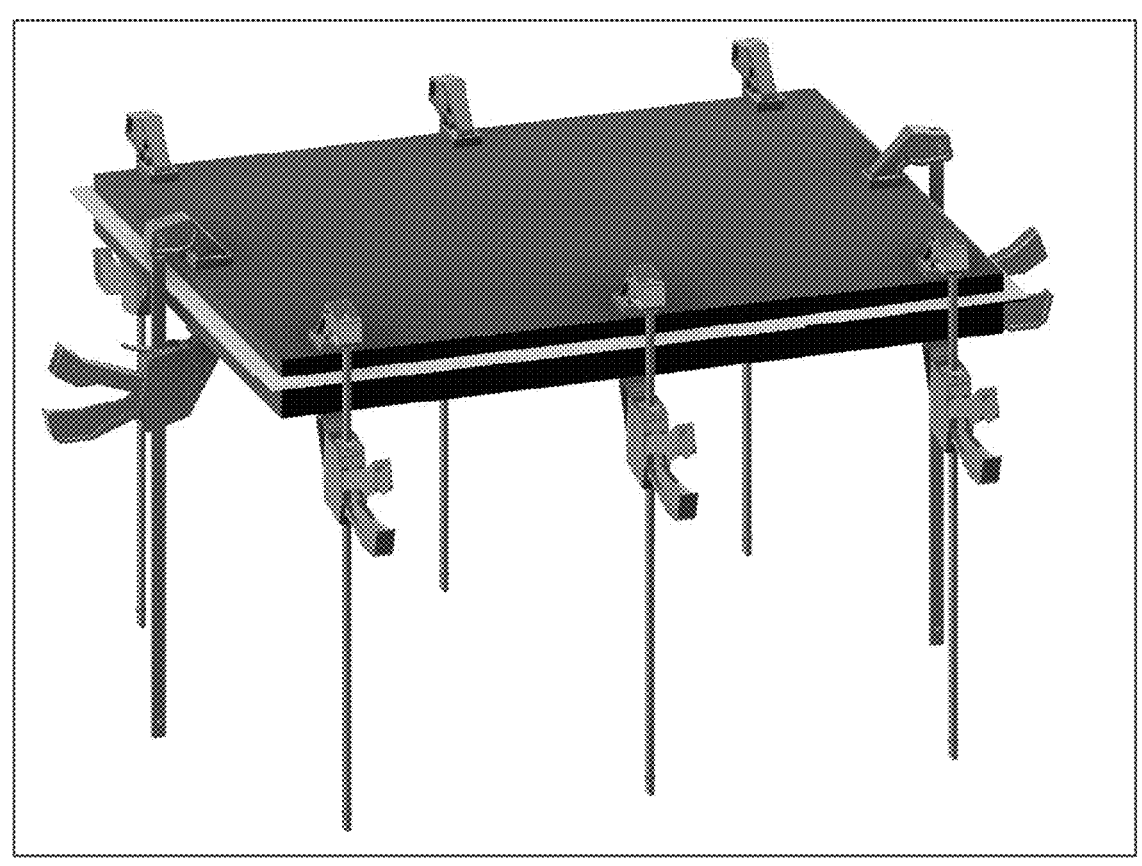
Figure 24:
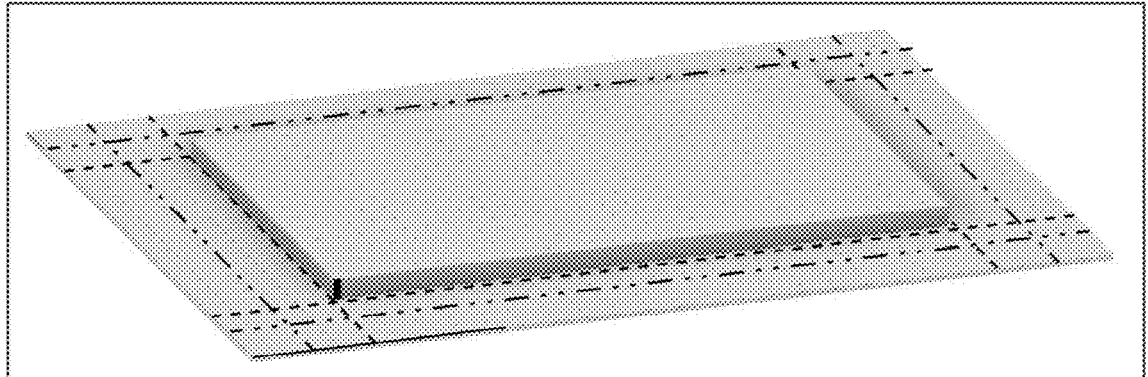

Referring now to FIGS. 17 through 24, the flameproof shell of the example embodiments can be fabricated using the manufacturing methods disclosed below. FIG. 17 illustrates some of the elements used in an example embodiment to fabricate the flameproof shell, the elements including a matrix cap, a matrix base, and several layers of materials interposed between the matrix cap and the matrix base. The fabrication process in an example embodiment includes the following operations.

1. Layer 1 is placed on the Base of the Matrix with the side intended to face flame or a heat source facing towards the Internal Surface of the Base of the Matrix (See FIG. 18).

2. (Optional Step) An adhesive (e.g., glue) is prepared and applied as a thin layer to the Layer 1 surface that is intended to face Layer 2.

3. Layer 2 is placed on the surface of Layer 1 (See FIG. 19).

4. (Optional Step) The adhesive (e.g., glue) is prepared and applied as a thin layer to the Layer 2 surface that is intended to face Layer 3.

5. Layer 3 is placed on the surface of Layer 2 (See FIG. 20).

6. (Optional step in the case of building a 4-layer composite) The adhesive (e.g., glue) is prepared and applied as a thin layer to the Layer 3 surface that is intended to face Layer 4.

7. (Optional step in the case of building a 4-layer composite) Layer Four is placed on the surface of Layer Three (See FIG. 21).

8. The Matrix Cap is placed on the surface of Layer 3 (or Layer 4 in the case of building a 4-layer composite) and is aligned with the Base of the Matrix (See FIG. 22).

Figure 23:
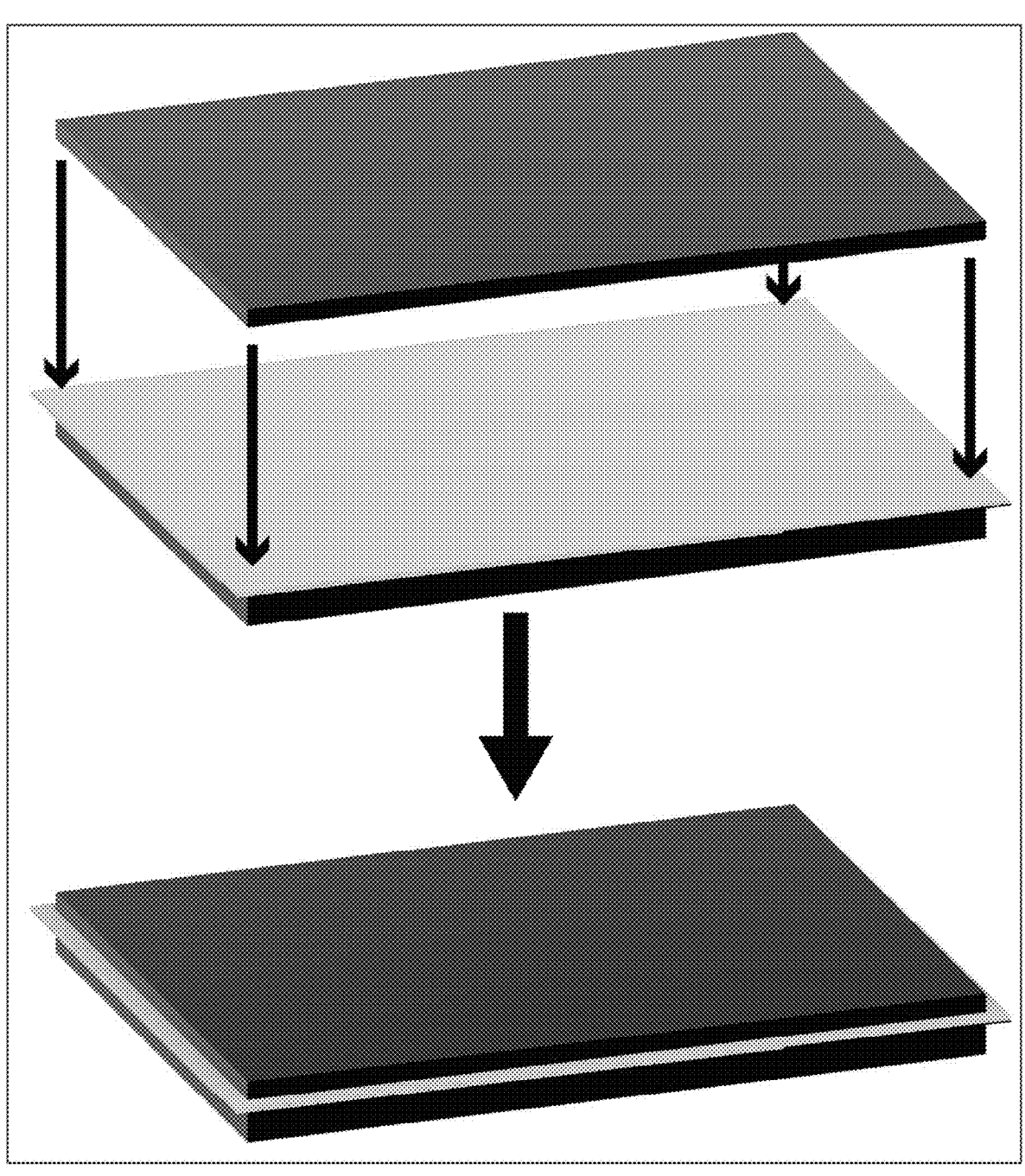
Figure 25:
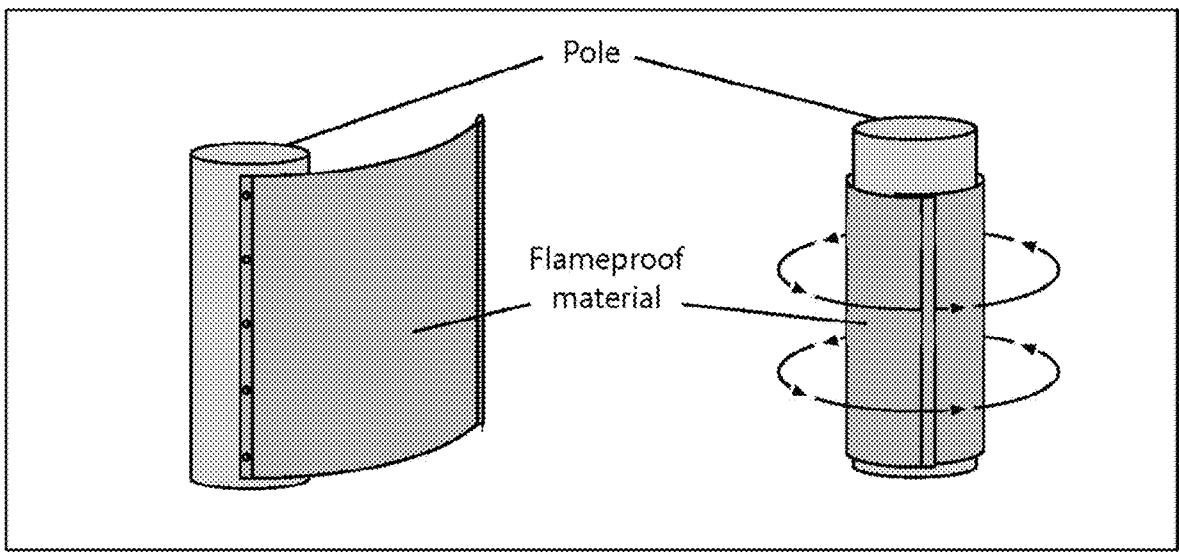
FIGS. 25 through 30 illustrate examples of various appli-cations in which the flameproof shell disclosed herein can be used.
Figure 26:
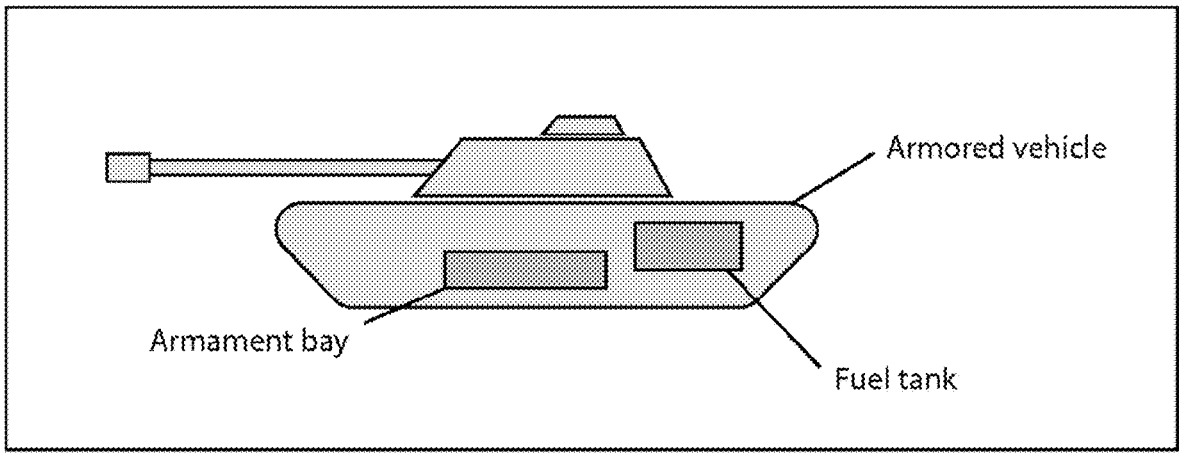
Figure 27:
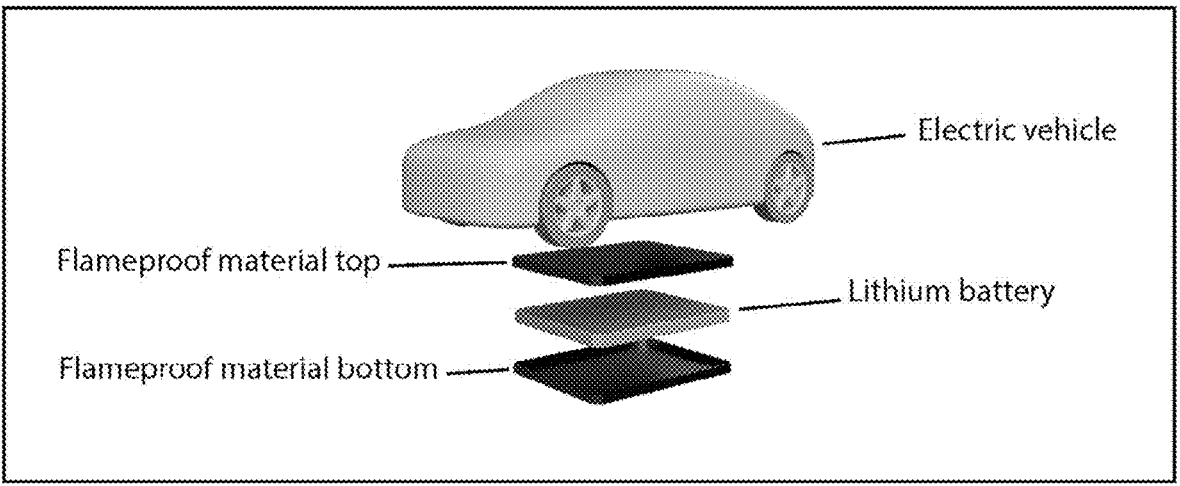
Figure 28:
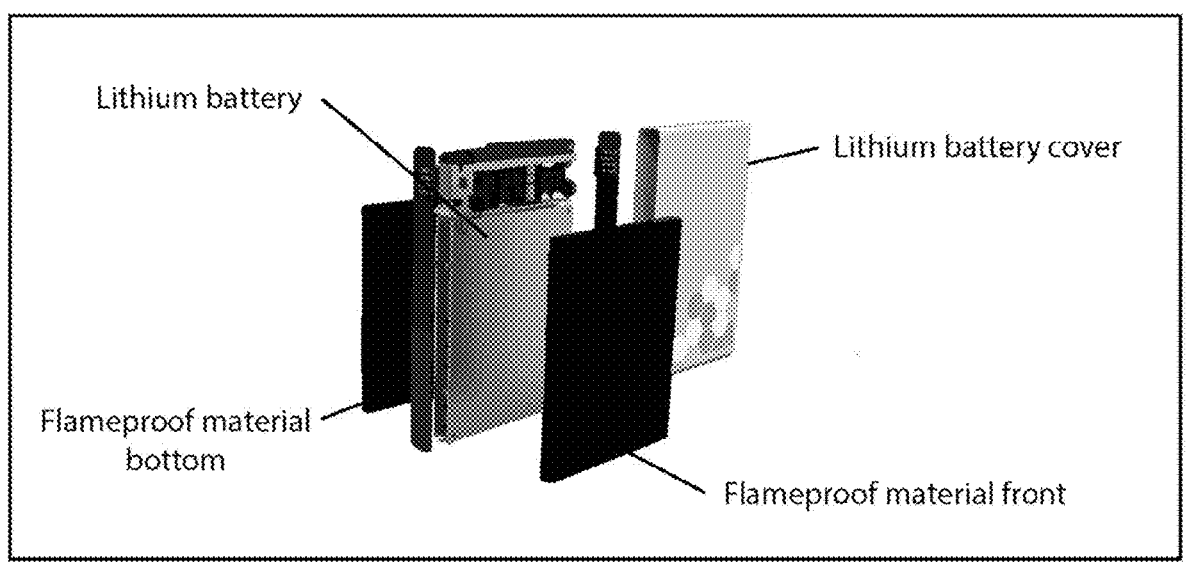
Figure 29:
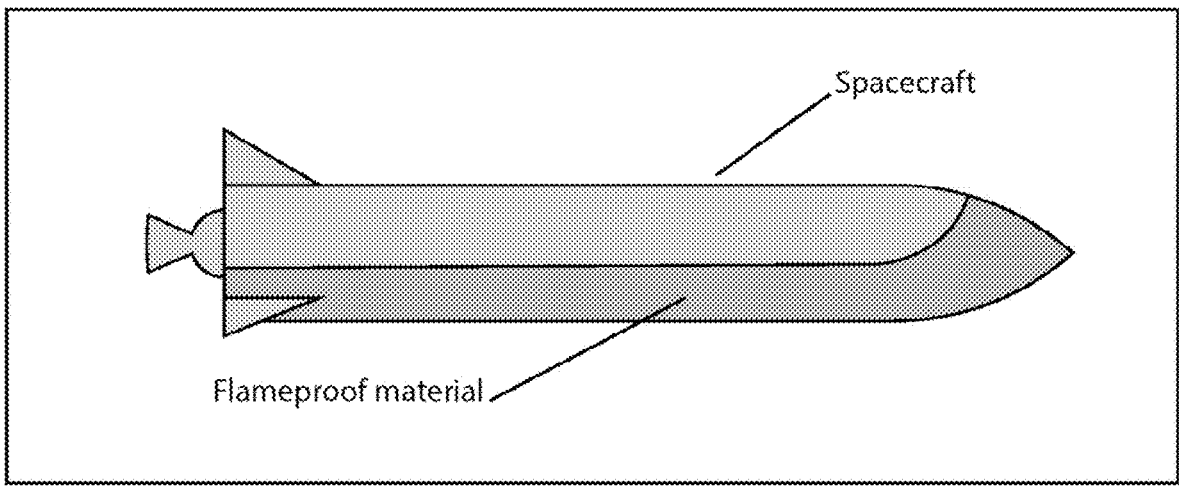
Figure 30:
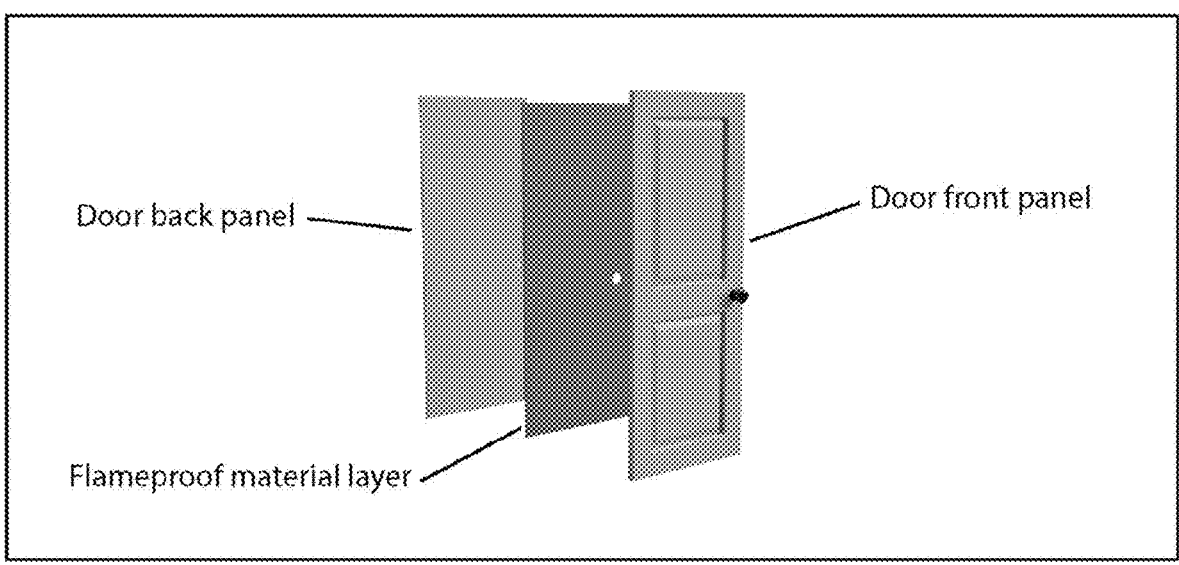

9. The Matrix Cap is secured to the Base of the Matrix and pressed together, by any means that can deliver a similar force on every side of the Matrix, including different types of clamps, pressing machines, etc. (See FIG. 23—in this case, clamps are shown in FIG. 23).

10. The matrix is left secure and pressed until the adhesive (e.g., glue) is settled after a predetermined length of time.

11. After the adhesive (e.g., glue) has settled, the pressing mechanism and fastenings are removed from the Matrix.

12. The Base of the Matrix and the Matrix Cap are separated.

13. The ready Flameproof Composite is removed from the base of the matrix (See FIG. 24).

14. The Edges of the ready Flameproof Composite are trimmed and attached by a fastener, such as aramid thread or other fire-resistant fiber (See FIG. 24).

Figure 32:
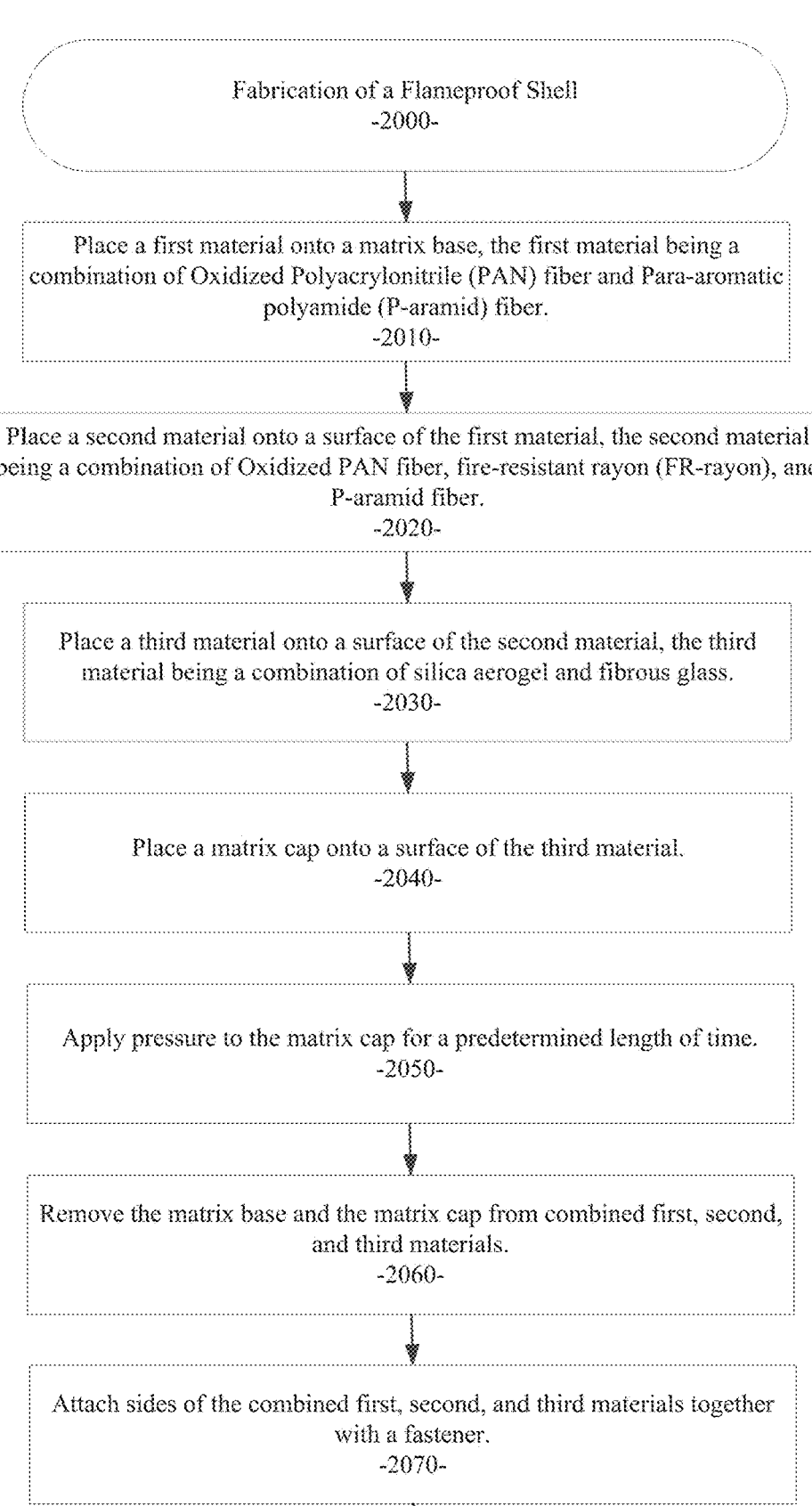

FIGS. 31 and 32 illustrate process flow diagrams that show example embodiments of methods as described herein. Referring to FIG. 31, a method 1000 for fabricating a flameproof garment according to an example embodiment includes: partitioning a first material into garment portions, the first material being a combination of Oxidized Polyacrylonitrile (PAN) fiber and Para-aromatic polyamide (P-aramid) fiber (operation block 1010); partitioning a second material into garment portions, the second material being a combination of Oxidized PAN fiber, fire-resistant rayon (FR-rayon), and P-aramid fiber (operation block 1020); partitioning a third material into garment portions, the third material being a combination of silica aerogel and fibrous glass configured for bonding with the first or second materials, the second material being configured for bonding with the first or third materials (operation block 1030); bonding the third material with the first or second materials (operation block 1040); bonding the second material with the first or third materials (operation block 1050); and assembling the bonded materials into a flameproof garment by attaching sides of the garment portions together with a fastener (operation block 1060).

Referring to FIG. 32, a method 2000 for fabricating a flameproof shell according to an example embodiment includes: placing a first material onto a matrix base, the first material being a combination of Oxidized Polyacrylonitrile (PAN) fiber and Para-aromatic polyamide (P-aramid) fiber (operation block 2010); placing a second material onto a surface of the first material, the second material being a combination of Oxidized PAN fiber, fire-resistant rayon (FR-rayon), and P-aramid fiber (operation block 2020); placing a third material onto a surface of the second material, the third material being a combination of silica aerogel and fibrous glass (operation block 2030); placing a matrix cap onto a surface of the third material (operation block 2040); applying pressure to the matrix cap for a predetermined length of time (operation block 2050); removing the matrix base and the matrix cap from combined first, second, and third materials (operation block 2060); and attaching sides of the combined first, second, and third materials together with a fastener (operation block 2070).

TABLE 1

Composition/Materials for Example Embodiments

| Material | Trade name | Manufacturer | Chemical composition | Function |
|---|---|---|---|---|
| #1 | RST-75E | CarbonX/ Techtex Industries | 70% oxidized PAN (at least 50% oxidized PAN), 30% P-aramid (at least 15% P-aramid) | Flame, heat, water, vapour, chemical and tear resistance. Used for: Layer 1, 2, 3, 4 |
| #2 | CR-80-Repel | CarbonX/ Techtex Industries | 50% oxidized PAN, 30% FR-rayon (at least 20% FR-rayon), 17% P-aramid, 3% antistat polyester. | Flame, heat, water, vapour, and chemical resistance. Used for: Layers 1, 2, 3 and 4. |
| #3 | CR-59-E | CarbonX/ Techtex Industries | 86% oxidized PAN, 14% P-aramid | Flame, heat, water, vapour, and chemical resistance. Used for: Layers 1, 2, 3 and 4. |
| #4 | Pyrogel XTE 5 mm | Aspen Aerogels | 30-40%— - Synthetic amorphous silica aerogel 10-20% Methylsilylated silica 40-50% Fibrous glass 1-10% Iron oxide 1-5% aluminum trihydrate | Highly heat-resistant and water-proof. Used for: Layers 2 and 3. |
| #5 | Pyrogel XTE 10 mm | Aspen Aerogels | 30-40%— - Synthetic amorphous silica aerogel 10-20% Methylsilylated silica 40-50% Fibrous glass 1-10% Iron oxide 1-5% aluminum trihydrate | Highly heat-resistant and water-proof. Used for: Layers 2 and 3. |
| #6 | Woven Cotton | | 100%—cotton or other moisture-wicking fiber | Moisture Management and Ventilation. Used for: Layer 5 |
| #7 | Dragon Skin Silicone | Smooth-On | Silicone elastomer | Heat resistant two-part silicone rubber used as Glue or Adhesive |

TABLE 2A-continued

Configurations of Example Embodiments by Composition and Pattern of Layer Alignment (4-Layer composites)

| Configuration Number | Layer One | Layer Two | Layer Three | Layer Four |
|---|---|---|---|---|
| #6 | Material #2 | Material #3 | Material #4 | Material #3 |
| #7 | Material #2 | Material #3 | Material #4 | Material #2 |
| #8 | Material #2 | Material #2 | Material #4 | Material #3 |
| #9 | Material #3 | Material #3 | Material #4 | Material #3 |
| #10 | Material #3 | Material #3 | Material #4 | Material #2 |
| #11 | Material #3 | Material #2 | Material #4 | Material #3 |
| #12 | Material #3 | Material #2 | Material #4 | Material #2 |
| #13 | Material #1 | Material #2 | Material #5 | Material #3 |
| #14 | Material #1 | Material #3 | Material #5 | Material #2 |
| #15 | Material #1 | Material #2 | Material #5 | Material #2 |

TABLE 2A

Configurations of Example Embodiments by Composition and Pattern of Layer Alignment (4-Layer composites)

| Configuration Number | Layer One | Layer Two | Layer Three | Layer Four |
|---|---|---|---|---|
| #1 | Material #1 | Material #2 | Material #4 | Material #3 |
| #2 | Material #1 | Material #3 | Material #4 | Material #2 |
| #3 | Material #1 | Material #2 | Material #4 | Material #2 |
| #4 | Material #1 | Material #3 | Material #4 | Material #3 |
| #5 | Material #2 | Material #2 | Material #4 | Material #2 |

TABLE 2A-continued

Configurations of Example Embodiments by Composition and Pattern of Layer Alignment (4-Layer composites)

| Configuration Number | Layer One | Layer Two | Layer Three | Layer Four |
|---|---|---|---|---|
| #16 | Material #1 | Material #3 | Material #5 | Material #3 |
| #17 | Material #2 | Material #2 | Material #5 | Material #2 |
| #18 | Material #2 | Material #3 | Material #5 | Material #3 |
| #19 | Material #2 | Material #3 | Material #5 | Material #2 |
| #20 | Material #2 | Material #2 | Material #5 | Material #3 |

TABLE 2A-continued

Configurations of Example Embodiments by Composition and
Pattern of Layer Alignment (4-Layer composites)

| Configuration Number | Layer One | Layer Two | Layer Three | Layer Four |
|---|---|---|---|---|
| #21 | Material #3 | Material #3 | Material #5 | Material #3 |
| #22 | Material #3 | Material #3 | Material #5 | Material #2 |
| #23 | Material #3 | Material #2 | Material #5 | Material #3 |
| #24 | Material #3 | Material #2 | Material #5 | Material #2 |

TABLE 2B

3-Layer composites

| Configuration Number | Layer 1 | Layer 2 | Layer 3 |
|---|---|---|---|
| #25 | Material #1 | Material #4 | Material #1 |
| #26 | Material #1 | Material #4 | Material #2 |
| #27 | Material #1 | Material #4 | Material #3 |
| #28 | Material #2 | Material #4 | Material #1 |
| #29 | Material #2 | Material #4 | Material #2 |
| #30 | Material #2 | Material #4 | Material #3 |
| #31 | Material #3 | Material #4 | Material #1 |
| #32 | Material #3 | Material #4 | Material #2 |
| #33 | Material #3 | Material #4 | Material #3 |
| #34 | Material #1 | Material #5 | Material #1 |
| #35 | Material #1 | Material #5 | Material #2 |
| #36 | Material #1 | Material #5 | Material #3 |
| #37 | Material #2 | Material #5 | Material #1 |
| #38 | Material #2 | Material #5 | Material #2 |
| #39 | Material #2 | Material #5 | Material #3 |
| #40 | Material #3 | Material #5 | Material #1 |
| #41 | Material #3 | Material #5 | Material #2 |
| #42 | Material #3 | Material #5 | Material #3 |

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, flameproof material for wearables, personal protective equipment, lithium-ion battery flame protection, and general flame protection are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of appended claims.

What is claimed is:

1. A flameproof material comprising:
   a first material being a combination of Oxidized Polyacrylonitrile (PAN) fiber and Para-aromatic polyamide (P-aramid) fiber:
   a second material being a combination of Oxidized PAN fiber, fire-resistant rayon (FR-rayon), and P-aramid fiber; and
   a third material being a combination of silica aerogel and fibrous glass configured for bonding with the first or second materials, the second material being configured for bonding with the first or third materials,
   the flameproof material having a laminate structure comprising, in order from a flame-facing side to a second side: (i) a first fabric layer comprising the first material; (ii) an intermediate third layer consisting essentially of a silica aerogel and a fibrous glass; and (iii) a second fabric layer comprising the second material; wherein the third layer is bonded to the first and second fabric layers.

2. The flameproof material of claim 1 further including a fourth layer comprising a fourth material being a combination of Oxidized PAN fiber and P-aramid fiber in a composition different from the first material, the fourth material configured for bonding with the first, second, or third materials and disposed proximate the second fabric layer.

3. The flameproof material of claim 2 further including a fifth material being a moisture-wicking fiber, the fifth material configured for bonding with the fourth or third materials.

4. The flameproof material of claim 1 wherein the third material includes iron oxide and aluminum trihydrate and comprises at least 30% amorphous silica and at least 40% fibrous glass by weight.

5. The flameproof material of claim 1 wherein the first material includes at least 50% Oxidized PAN fiber.

6. The flameproof material of claim 1 wherein the first material includes at least 15% P-aramid fiber.

7. The flameproof material of claim 1 wherein the second material includes at least 20% FR-rayon.

8. The flameproof material of claim 1 wherein the third material includes at least 30% amorphous silica and at least 40% fibrous glass and has a thickness of between 5 mm and 10 mm.

9. The flameproof material of claim 3 wherein the moisture-wicking fiber is cotton.

10. The flameproof material of claim 1 wherein the second material is configured for bonding with the first material using an adhesive.

\* \* \* \* \*